United States Patent [19]

Kawakami et al.

[11] Patent Number: 5,652,626
[45] Date of Patent: Jul. 29, 1997

[54] IMAGE PROCESSING APPARATUS USING PATTERN GENERATING CIRCUITS TO PROCESS A COLOR IMAGE

[75] Inventors: Haruko Kawakami; Hidekazu Sekizawa, both of Yokohama; Naofumi Yamamoto, Tokyo, all of Japan

[73] Assignee: Kabushiki Kaisha Toshiba, Kawasaki, Japan

[21] Appl. No.: 299,970

[22] Filed: Sep. 2, 1994

[30] Foreign Application Priority Data

Sep. 3, 1993 [JP] Japan .................................. 5-219294

[51] Int. Cl.$^6$ ............................................... H04N 7/08
[52] U.S. Cl. ........................ 348/463; 348/467; 348/473; 380/54; 399/1
[58] Field of Search ............................ 348/461, 463, 348/465, 467, 473; 358/500, 540, 530; 380/55, 54; 355/201, 202, 326 R, 133

[56] References Cited

U.S. PATENT DOCUMENTS

| 4,218,697 | 8/1980 | Leventer | 348/478 |
| 5,134,484 | 7/1992 | Willson | 348/564 |
| 5,221,962 | 6/1993 | Backus et al. | 348/563 |
| 5,450,134 | 9/1995 | Legate | 348/460 X |

FOREIGN PATENT DOCUMENTS

| 0353974 | 2/1990 | European Pat. Off. . |
| 0506332 | 9/1992 | European Pat. Off. . |
| 3602563 | 4/1987 | Germany . |
| 4-294682 | 10/1992 | Japan . |
| 4-302268 | 10/1994 | Japan . |
| WO93/25038 | 12/1993 | WIPO . |

OTHER PUBLICATIONS

W. Szepanski, "Additive binary data transmission in video signals", 1980 pp. 343–352.
Patent Abstracts of Japan, vol. 14, No. 511 (E-0999), Nov. 8, 1990, JP 2 213282, Aug. 24, 1990.
Patent Abstracts of Japan, vol. 17, No. 178 (E-1347), Apr. 7, 1993, JP 4 332260, Nov. 19, 1992.

Primary Examiner—John K. Peng
Assistant Examiner—Nathan J. Flynn
Attorney, Agent, or Firm—Oblon, Spivak, McClelland, Maier & Neustadt, P.C.

[57] ABSTRACT

In the apparatus for processing a color image, a data signal representing another information differs from the color image is generated by a generating means. The another information is embedded into the color image by varying one of a color difference and a chroma of the color image in accordance with the data signal by an image processing means.

7 Claims, 14 Drawing Sheets

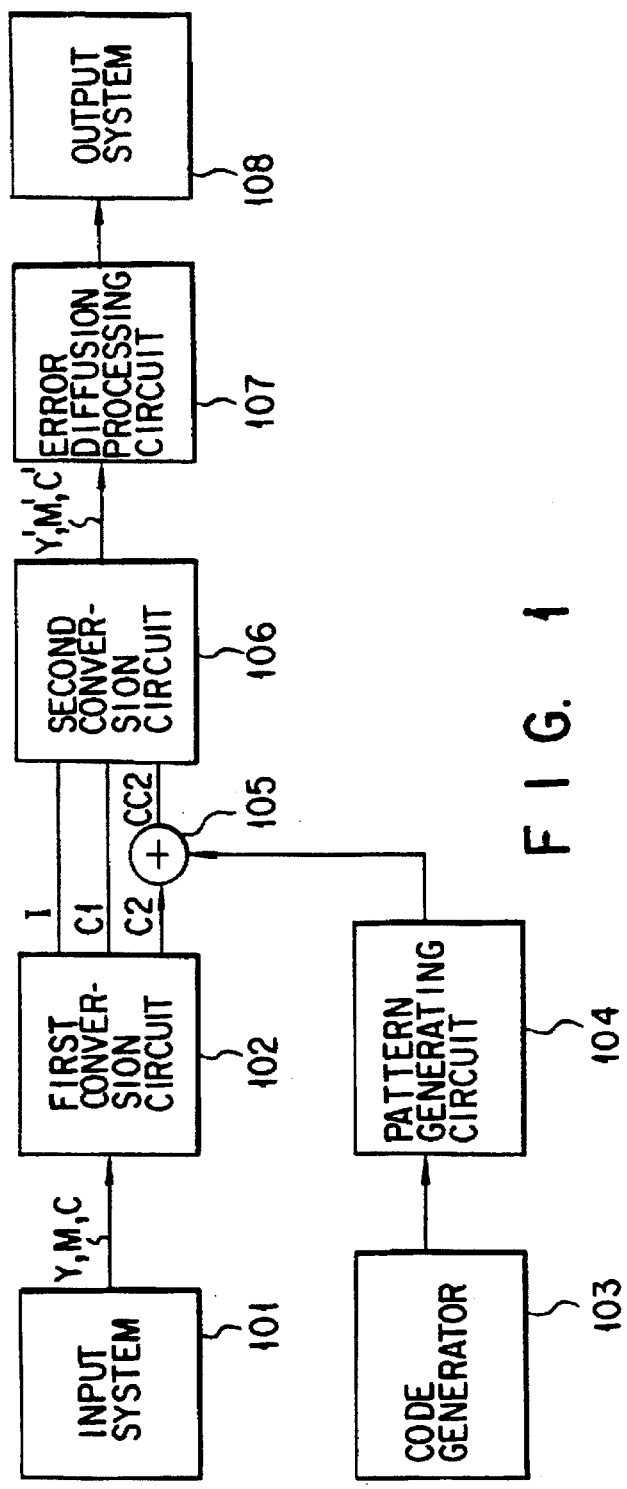
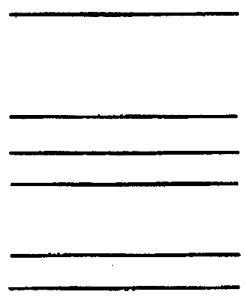
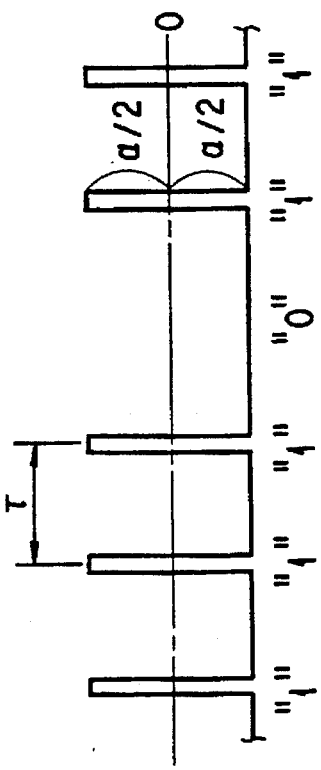

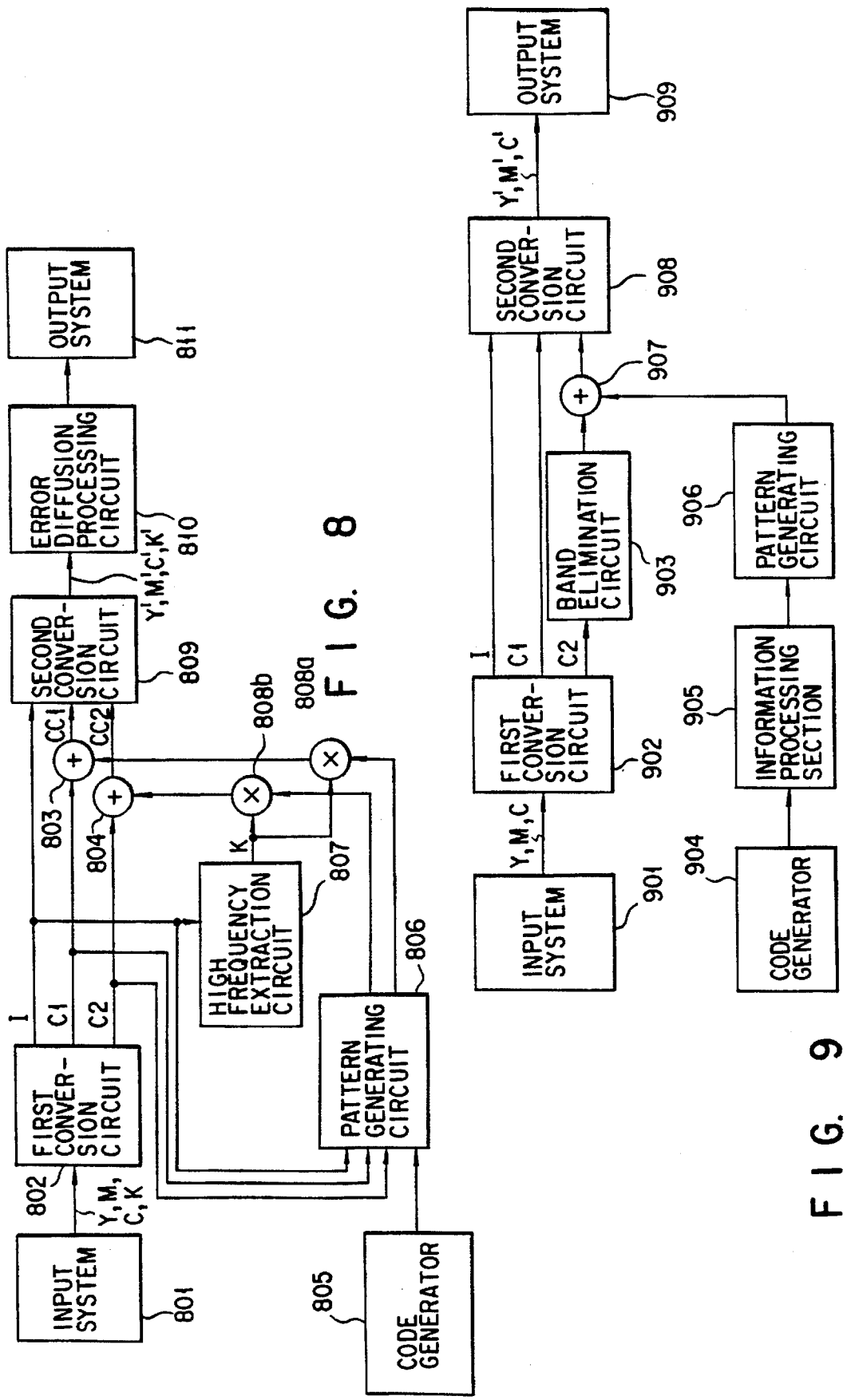

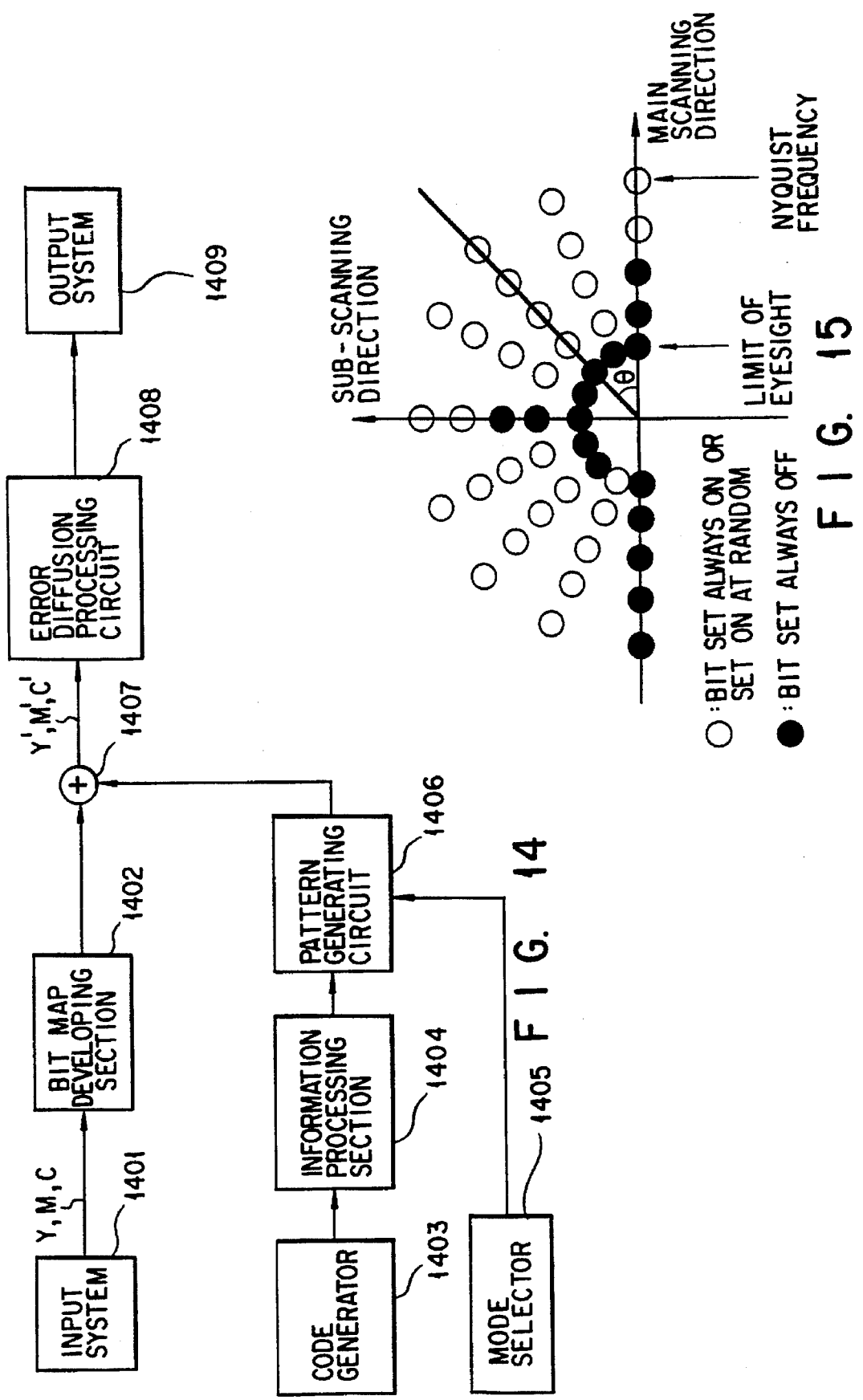

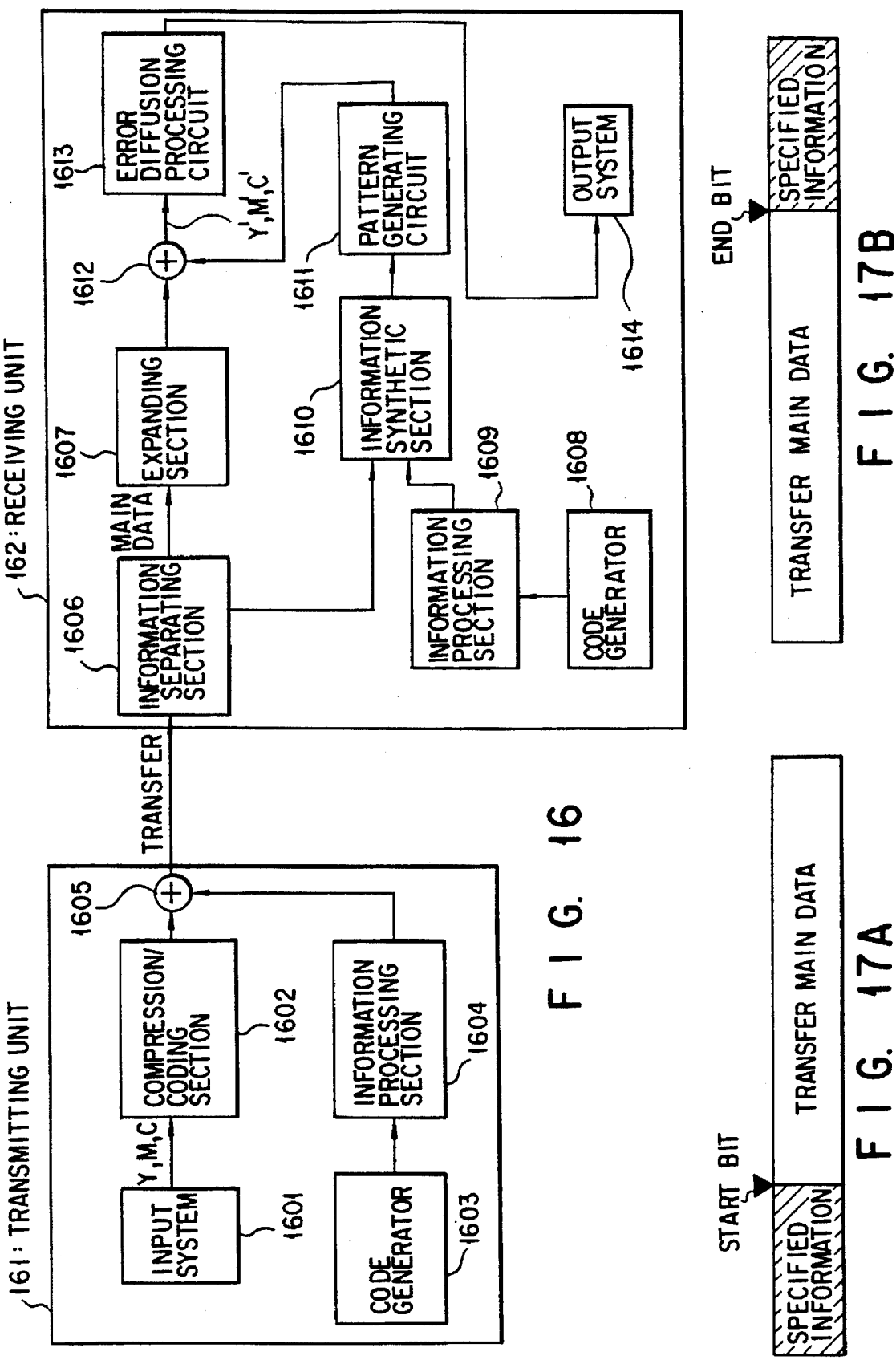

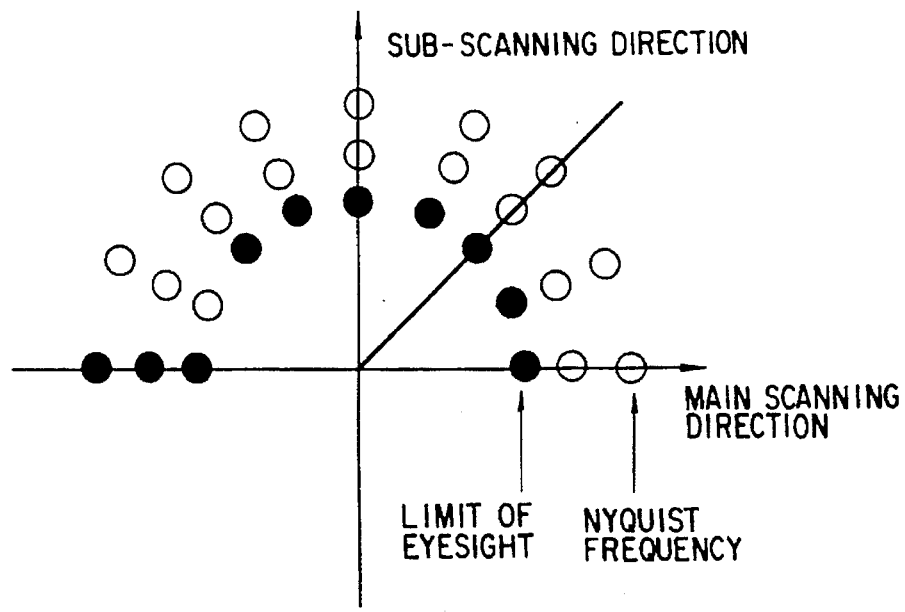
F I G. 18
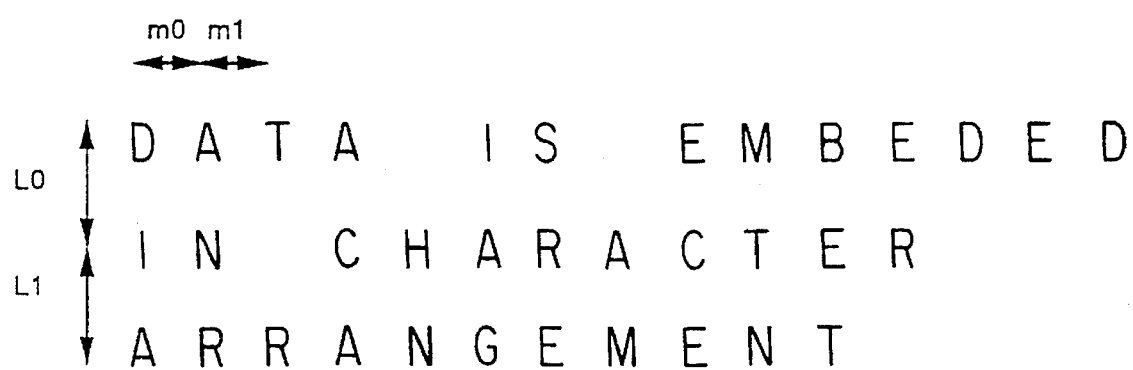
F I G. 19

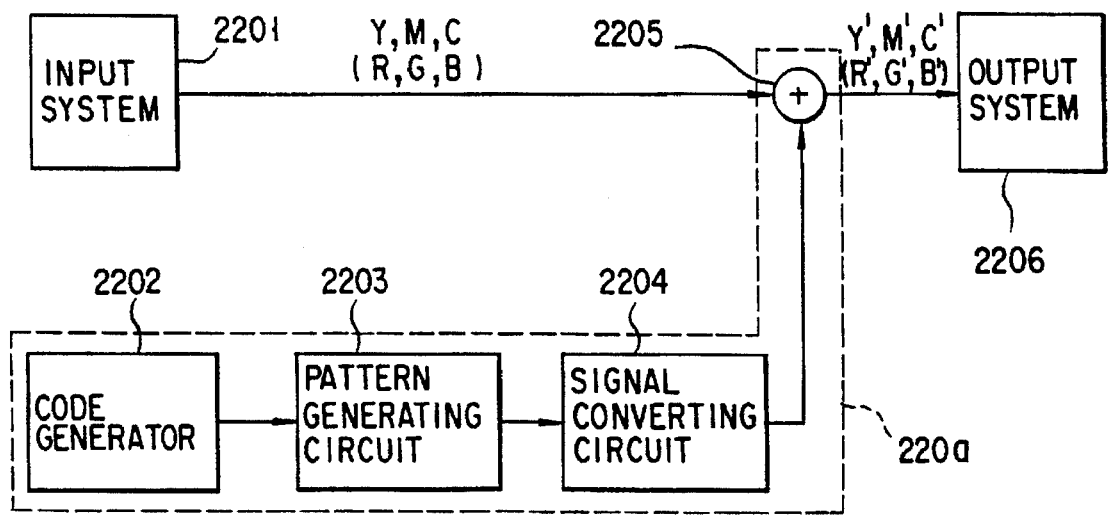
F I G. 22
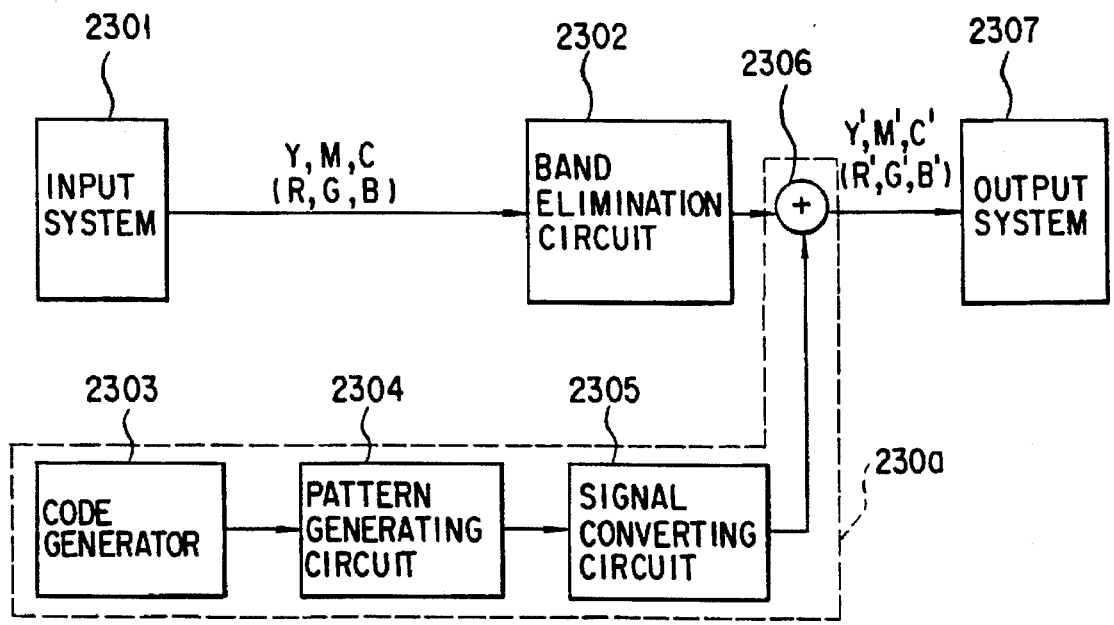
F I G. 23

IMAGE PROCESSING APPARATUS USING PATTERN GENERATING CIRCUITS TO PROCESS A COLOR IMAGE

BACKGROUND OF THE INVENTION

1. Field of the Invention

This invention relates to an image processing apparatus for embedding another information into image information without causing the unnatural sense of vision by use of a redundancy included in the image information, and/or an image processing apparatus for extracting another information from the image information into which the another information is embedded.

2. Description of the Related Art

The technique for superposing text data on an color image and recording the same is disclosed in the article by Nakamura, Matsui et al. "Combining/Coding Method of Text Data to Image by Color Density Pattern" Image Electronics Institution Papers, Vol. 17, No. 4 (1988), pp. 194–198. According to this technique, an attention is directed to the point that image data has a higher redundancy. Another data, for example, text data is superposed on the redundancy portion of the image data by use of color density pattern method. However, in general, the resolution is lowered when the color density pattern method is used and it becomes impossible to display a high-definition image. Further, the image quality is degraded by irregular color or the like due to a variation in the pixel arrangement caused by superposition of information.

As an example of application of dither image recording capable of permitting higher definition display compared with that of the color density pattern method, the technique is disclosed in the article by Tanaka, Nakamura, Matsui "Embedding of Character Information into Compositional Dither Image by 2k-Dimensional Vector" Image Electronics Institution Papers, Vol. 19, No. 5 (1990), pp 337–343. The technique has a defect that the image quality is degraded when character information is embedded. Further, the technique has another defect that it cannot be applied to the high-definition recording technique such as the error diffusion recording method.

In addition, according to the above techniques, even if it is possible in principle to extract character information or the like from an actually printed image, dither pattern information cannot be precisely printed on paper or the like in the actual general recording process and it is difficult to read such information. Therefore, it becomes extremely difficult to read the embedded information. It is only possible to extract from the image data (such as transmission data and data in the floppy disk) used as a basis for printing. In order to read out coded specified information such as character information from the actual recording image based on the above techniques, it is definitely necessary to use an extremely high precision printer which can print the image with high resolution exceeding the limit of eyesight of a man and reads the image by use of a high precision reading device.

Further, with the above method, noises at the time of recording and reading will occur and it becomes difficult to read the coded information such as character information separately from the image information. In addition, even if the color-recorded image information is recorded by use of a high precision recording device, image dots of respective colors of the color-recorded image information overlap each other, and therefore, it is difficult to form a precise pixel shape. In this case, it is extremely difficult to read pixel data of the respective colors separately from the image information.

Further, in Japanese Patent Disclosure (KOKAI) No. 4-294682, the technique for attaching another information to the yellow ink is described. According to this technique, there occurs no problem when an original image is constructed only by pixels containing only the yellow component. However, when it contains another color, it is impossible to ensure that an image which is not visually significant can be recorded simply by adding yellow. Further, in the case of cyan or magenta which does not contain the yellow component, a problem that the specified information cannot be added occurs.

SUMMARY OF THE INVENTION

An object of the present invention is to provide an image processing apparatus for embedding another information into image information without giving the unnatural sense of vision.

Another object of the present invention is to provide an image processing apparatus capable of easily extracting another information from an image in which the another information is embedded.

According to a first aspect of the present invention, there is provided an apparatus for processing a color image, characterized by comprising: means for generating a data signal representing another information which differs from the color image; and image processing means for embedding the another information into the color image by varying one of a color difference and a chroma of the color image in accordance with the data signal.

According to a second aspect of the present invention, there is provided an apparatus for processing a color image, characterized by comprising: means for generating a data signal representing another information which differs from the color image; and image processing means for embedding the another information into the color image by superposing a moire pattern on the color image, the moire pattern including a plurality of frequency components in accordance with the data signal generated by the generating means.

According to a third aspect of the present invention, there is provided an apparatus for processing a monochromatic image, characterized by comprising: means for generating a data signal representing another information which differs from the monochromatic image; and image processing means for embedding the another information into the monochromatic image by varying luminance of the monochromatic image in accordance with the data signal.

As described above, according to the present invention, the another information can be embedded into color image information without giving the unnatural sense of vision and causing degradation in the image quality when the image information is printed.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing an embedding processing section in an image processing apparatus according to first and fourth embodiments of the present invention;

FIGS. 2A and 2B are diagrams showing a pattern generated by a pattern generating circuit shown in FIG. 1;

FIG. 8 is a block diagram showing an embedding processing section in an image processing apparatus according to a third embodiment of the present invention;

FIG. 9 is a block diagram showing an embedding processing section in image processing apparatus according to sixth and seventh embodiments of the present invention;

FIG. 14 is a block diagram showing an embedding processing section in image processing apparatus according to eighth and tenth embodiments of the present invention;

FIG. 15 is a diagram showing the bit arrangement on a Fourier transform plane used in the eighth embodiment shown in FIG. 14;

FIG. 16 is a block diagram showing an embedding processing section in an image processing apparatus according to a ninth embodiment of the present invention;

FIGS. 17A and 17B are diagrams showing format of transferring data in the ninth embodiment shown in FIG. 16;

FIG. 18 is a diagram showing the bit arrangement on a Fourier transform plane used in the tenth embodiment shown in FIG. 14;

FIG. 19 is a diagram showing the output character arrangement on a manuscript paper in the tenth embodiment shown in FIG. 14;

FIG. 22 is a diagram showing an embedding processing section in the case where the pattern signal is directly added to the color signals with regard to the first to fifth embodiments; and FIG. 23 is a diagram showing an embedding processing section in the case where the pattern signal is directly added to the color signals with regard to the sixth and seventh embodiments.

DETAILED DESCRIPTION OF THE PREFERRED EMBODIMENTS

Figure 3:
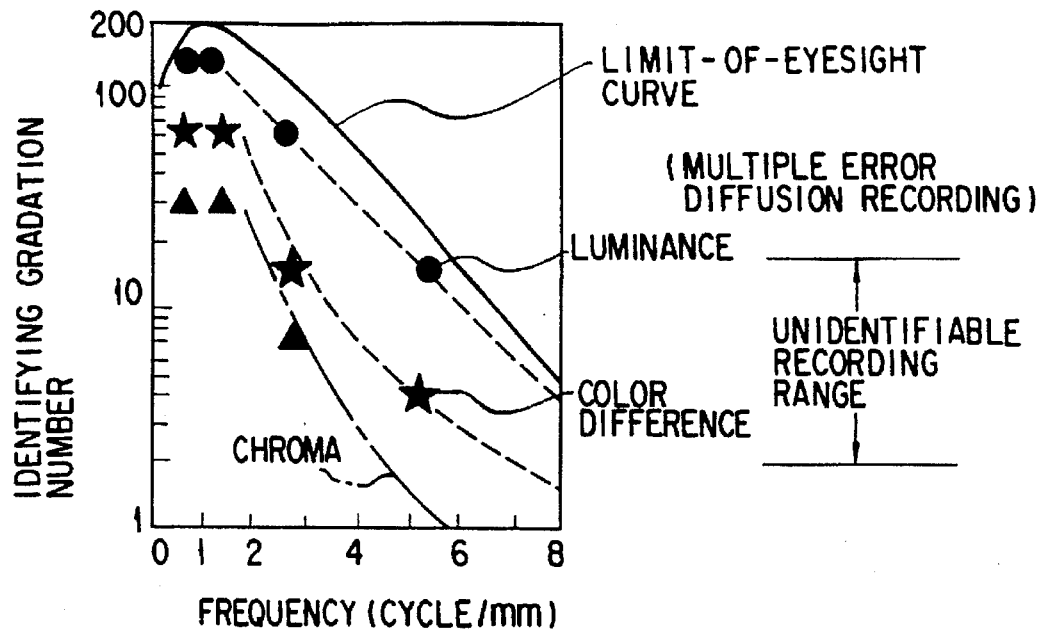
FIG. 3 is a graph showing the degree of gradation identifying ability of a human being for variations in the directions of luminance, color difference and chroma.

FIG. 1 is a block diagram showing an embedding processing section in an image processing apparatus according to a first embodiment of this invention. Three color component signals of substructive mixture Y, M, C which representing color densities of yellow, cyan, magenta in color image recording/printing are supplied to an input system 101 formed of an input terminal or the like. First color signals Y, M, C input to the input system 101 are supplied to a first conversion circuit 102. The first conversion circuit 102 effects the first converting operation based on the color signals Y, M, C supplied from the input system 101 so as to create a luminance signal I and two color difference signals C1, C2. The luminance signal I is supplied to a second conversion circuit 106. The color difference signal C1 which is one of the above two color difference signals C1, C2 is directly supplied to the second conversion circuit 106 and the color difference signal C2 is supplied to the second conversion circuit via an adder 105.

The present embodiment includes a code generator 103. The code generator 103 holds another information which is different from image information (hereinafter referred to as specified information) and to be embedded into the color image, generates the specified information as code, and supplies the same to a pattern generating circuit 104. On the basis of this code, the pattern generating circuit 104 supplies to the adder 105 a pattern signal which is formed of rectangular waveform, as shown in FIG. 2A, in accordance with bit data "0", "1" constructing the code. If this pattern signal is repeatedly generated throughout plural lines, then a striped pattern is generated as shown in FIG. 2B. The same pattern signals may be repeatedly generated in the main scanning direction in the case where a width of the pattern signal is shorter than a length of one scanning line.

The adder 105 adds (or subtracts) the pattern signal from the pattern generating circuit 104 to (or from) a color difference signal C2 from the first conversion circuit 102. A signal CC2 obtained as the result of addition is supplied to the second conversion circuit 106. The second conversion circuit 106 effects the second converting operation based on the luminance signal I and color difference signal C1 from the first conversion circuit 102 and the signal CC2 from the adder 105 so as to create second color signals Y', M', C' which representing color densities of yellow, cyan, magenta in recording/printing of color image into which the specified information is embedded.

The second color signals Y', M', C' are supplied to an error diffusion processing circuit 107. The error diffusion processing circuit 107 subjects the received color signals Y', M', C' to the error diffusion process to create an error diffusion pattern. The generated error diffusion pattern is supplied to an output system 108. The output system 108 is, for example, a color printer, a color copying machine, or a color facsimile equipment, and outputs a color image (where, the specified pattern is being embedded into the color image by the adder 105) in accordance with the received error diffusion pattern. The error diffusion processing circuit 107 is not always required to provide. In this case, the second color signals Y', M', C' output from the second conversion circuit 106 are directly supplied to the output system 108. The output system 108 outputs a color image on the basis of the second color signals Y', M', C'.

Next, the operation of the first embodiment is explained.

The first color signals Y, M, C corresponding to ink amount in the printing of a color image are supplied to the first conversion circuit 102 from the input system 101. In the case where a color of the color image is white, a value of the first color signal is set as Y=M=C=0, whereas in the case where a color of the color image is black, a value of the first color signal is set as Y=M=C=1. The first color signals supplied from the input system are converted into a luminance signal I and color difference signals C1, C2 by the first conversion circuit 102. The conversion from the first color signals Y, M, C to the luminance signal I and color difference signals C1, C2 is effected according to the following equations.

$$I=1-(Y+M+C)/3 \tag{1}$$

$$C1=M-C \tag{2}$$

$$C2=Y-M \tag{3}$$

where, I indicates an amount corresponding to the luminance, C1 indicates a color difference in a direction from cyan to magenta, and C2 indicates a color difference in a direction from magenta to yellow.

Figure 21:
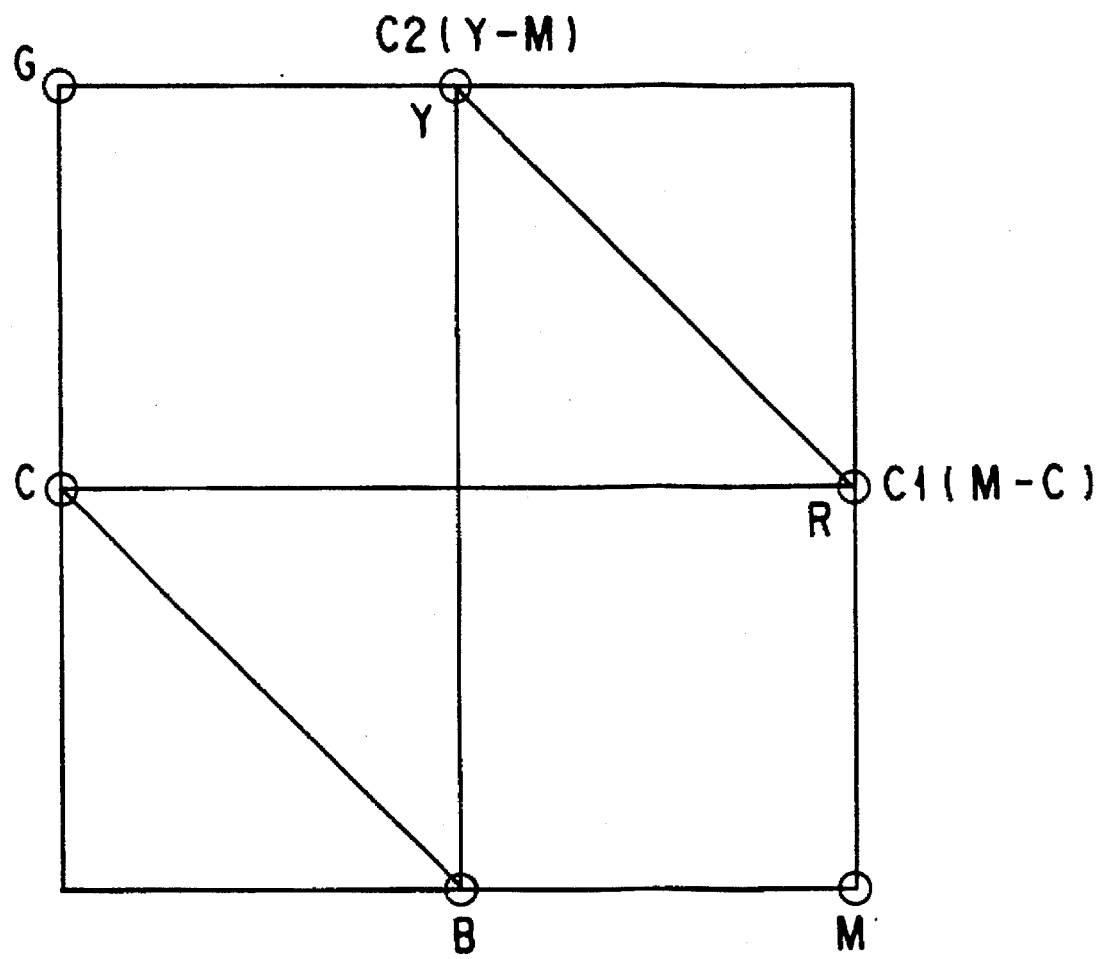
FIG. 21 is a diagram showing the color coordinate system defining directions of the color differences.

Assume that a C1–C2 color coordinate system is provided, as shown in FIG. 21. In this color coordinate system, six primary colors Y, M, C, R, G, B are arranged on the predetermined points. These points define the directions of color differences. As is apparent from the color coordinate system, the direction R—C can be expressed by the direction M—C (C1). Similarly, the direction Y—B can be expressed by the direction Y—M (C2).

The thus created luminance signal I and color difference signal C1 are supplied to the second conversion circuit 106 and the color difference signal C2 is supplied to the adder 105.

Assume that specified information to be embedded into image information contains printing date and time, name of the manufacturer, a type, and serial number of the printer, for example. Thus, by means of embedding specified information which indicates by which machine the printed matter is printed, the forgery may be discovered in a case that the printed matter is forged. As a result, an effect of the prevention from forgery is enhanced. The code generator 103 has a clock generator for creating printing date and time and includes a memory which has the name of the manufacturer, the type and the serial number of the printer previously stored therein. The specified information is generated from the code generator 103 in a code form.

Further, assume that the code includes data constructed by a total of 72 bits (corresponding to 9 bytes) including 17 bits for the date (displayed by six digits in the decimal notation), 11 bits for the time, 10 bits for the name of the manufacturer, and 34 bits for the name of the type and the device number assigned in this order from the most-significant-bit position, for example.

On the basis of the above code, the pattern generation circuit 104 supplies a pattern signal formed of rectangular wave which has simple ON and OFF levels as shown in FIG. 2A.

The adder 105 adds this pattern signal to the color difference signal C2 in the direction from blue to yellow. The pattern signal is generated throughout plural scanning lines. Thus, the striped pattern, shown in FIG. 2B, is superposed on the color image with reference to Y—M color difference. The pattern signal is added so that medium level of its amplitude can indicate 0 level of the image signal. If the amplitude is expressed by $\pm\alpha/2$ as shown in FIG. 2A, the color difference signal CC2 to which the pattern signal is added can be expressed by the following equation.

$$CC2=C2\pm\alpha/2 \tag{4}$$

The symbol "+" represents a case where a bit of the code indicates "1". The symbol "−" represents a case where a bit of the code indicates "0". Meanwhile, the pattern (shown in FIG. 2B) appearing later must not give the unnatural sense of vision. Therefore, it is necessary to set the amplitude $\alpha$ and period $\tau$ (shown in FIG. 2A) of the pattern by taking the limit of visual sense of a man into consideration. In this case, the pattern becomes less significant to the eyes of the man as the amplitude thereof is smaller and the period thereof is shorter.

FIG. 3 is a graph showing the results of study on the gradation identifying ability of a man in a case where variations in gradation are made in the luminance direction, color difference (Y—M) direction and chroma direction while an observer is observing a sample output by use of a printer capable of printing an image of as high frequency as 300 dpi. In this graph, the frequency is taken on the abscissa and the gradation identifying ability is taken on the ordinate. As is clearly seen from the graph, the gradation identifying ability of the human being is relatively lower for a variation in the color difference (Y—M) direction than for a variation in the luminance direction. Further, it is relatively lower for a variation in the chroma direction than for a variation in the color difference (Y—M) direction.

Further, as is clearly understood from FIG. 3, the visual sensitivity is abruptly lowered for a frequency higher than approx. 2 cycle/mm. That is, if a high frequency exceeding 2 cycle/mm is applied to the above pattern, the visually identifiable gradation number becomes less than approx. 60 gradations in the luminance direction and approx. 20 gradations in the color difference direction and chroma direction. Therefore, it cannot be identified by the human eyes even if the amplitude $\alpha$ is set relatively large. Further, since the amplitude of the pattern itself is large, the possibility that it is erased by noises is low. Therefore, even if a sensor with high S/N ratio is not used, the pattern can be easily extracted. Further, if the frequency of a pattern to be embedded is set equal to or higher than 3 cycle/mm, the possibility that it is visually identified can be lowered. In this case, it is sufficient to use a printer which can reproduce the frequency of 3 cycle/mm or more, that is, a printer which can reproduce image dots with the resolution of 6 dot/mm (=150 dpi) or more. It is not necessary to use a printer of specifically high precision. That is, it is sufficient if normal color image reproduction is possible and higher precision recording is not particularly necessary.

The signal CC2 created by the adder 105 is supplied to the second conversion circuit 106. Further, the luminance signal I, color difference signal C1 and signal CC2 are converted into the second color signals Y', M', C' by the second conversion circuit 106. In this case, the conversion into the second color signals is effected according to the following equations.

$$Y'=1-I+(C1+2\cdot CC2)/3 \tag{5}$$

$$M'=1-I+(C1-CC2)/3 \tag{6}$$

$$C'=1-I-(2\cdot C1+CC2)/3 \tag{7}$$

Thus, the second color signals Y', M', C' representing a color image into which specified information is embedded can be obtained.

Substituting I, C1, C2, and CC2 of the equations (1) to (4) into the equations (5) to (7), the following relation is obtained.

$$Y+M+C=Y'+M'+C' \tag{8}$$

Therefore, it is understood that the total color signal after the specified information is embedded is equal to the total color signal before the specified information is embedded. That is, the equation (8) indicates that the total ink amount is not changed due to the embedding process.

Next, when a printer whose gradation number is limited is used as the output system 108, pseudo gradation expression is made by use of a multiple error diffusion method. In this case, after embedding the pattern corresponding to the specified information into the image information and deriving color signals by the second conversion circuit 106, an error diffusion pattern is generated from the error diffusion processing circuit 107. By adopting expression in gradation by use of error diffusion method, the embedded specified information becomes more difficult to visually identify.

In the output system 108, the specified information is embedded into the image information and thus output (printed).

Next, the readout process of the specified information output in the above procedure is explained.

In the readout section of the image processing apparatus, a scanner (not shown) for reading the specified information from the image information printed in the process of the embedding processing section is provided. The scanner has an RGB (Blue, Green, Yellow) color separation filter.

Figure 4:
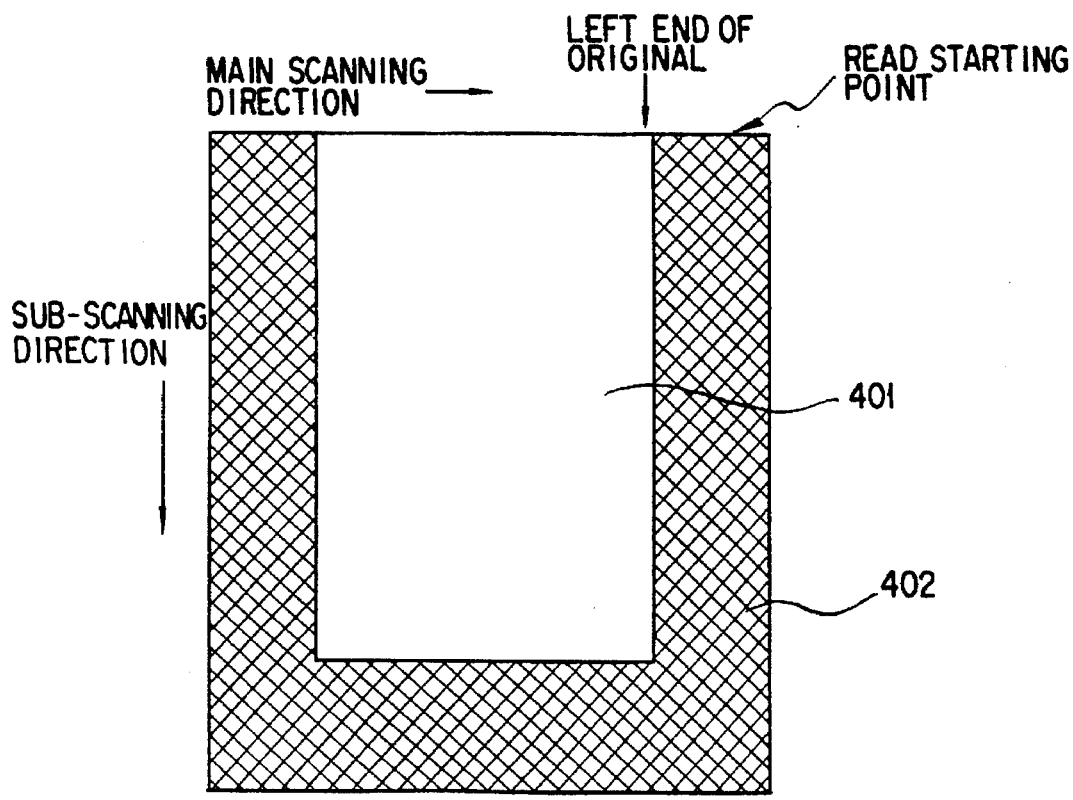
FIG. 4 is a diagram showing an original sheet on which image information having specified information embedded therein is printed and a sheet used for reading.

First, in order to surely obtain the specified information by way of separating the stabilizing embedded pattern of the specified information from the image pattern, the image information read throughout plural scanning lines is averaged. In this embodiment, data of 128 lines are read out and averaged to derive pixel data of one line. In this operation, since a complicated pattern appearing on the image is not averaged in the main scanning direction and an image of the same content is averaged for each sub-scanning line, specified information can be detected with high S/N ratio. However, in this case, it is practically impossible to precisely coincide the scanning direction for reading the original sheet 401 (see FIG. 4) with the actual recording direction and it is often the case to set the reading scanning direction at a certain angle with the recording direction. Therefore, if the reading scanning direction is set at a certain angle with the recording direction, the effect of the averaging will not be reflected. Therefore, a supporting sheet 402 of a larger size than the original sheet 401 is superposed on the original sheet 401 as shown in FIG. 4 and then the readout operation is effected. In case of using a reflection-type scanner, after setting the original sheet 401 on the sheet stand of the scanner, a supporting sheet 402 is superposed on the original sheet 401. Further, when the original sheet 401 has a white ground, a black sheet is used as the supporting sheet 402, and when the original sheet 401 has a black ground, a white sheet is used as the supporting sheet 402. Care must be taken to set one side edge of the supporting sheet 402 in front of the starting position of the reading operation in the main scanning direction. As a result, at the time of scanning, the starting position of the original sheet 401 is identified depending on whether the scanning position is white or black. Therefore, the starting position of the original sheet is detected at each time of scanning, thus making it possible to enhance the effect of the averaging process.

Figure 5:
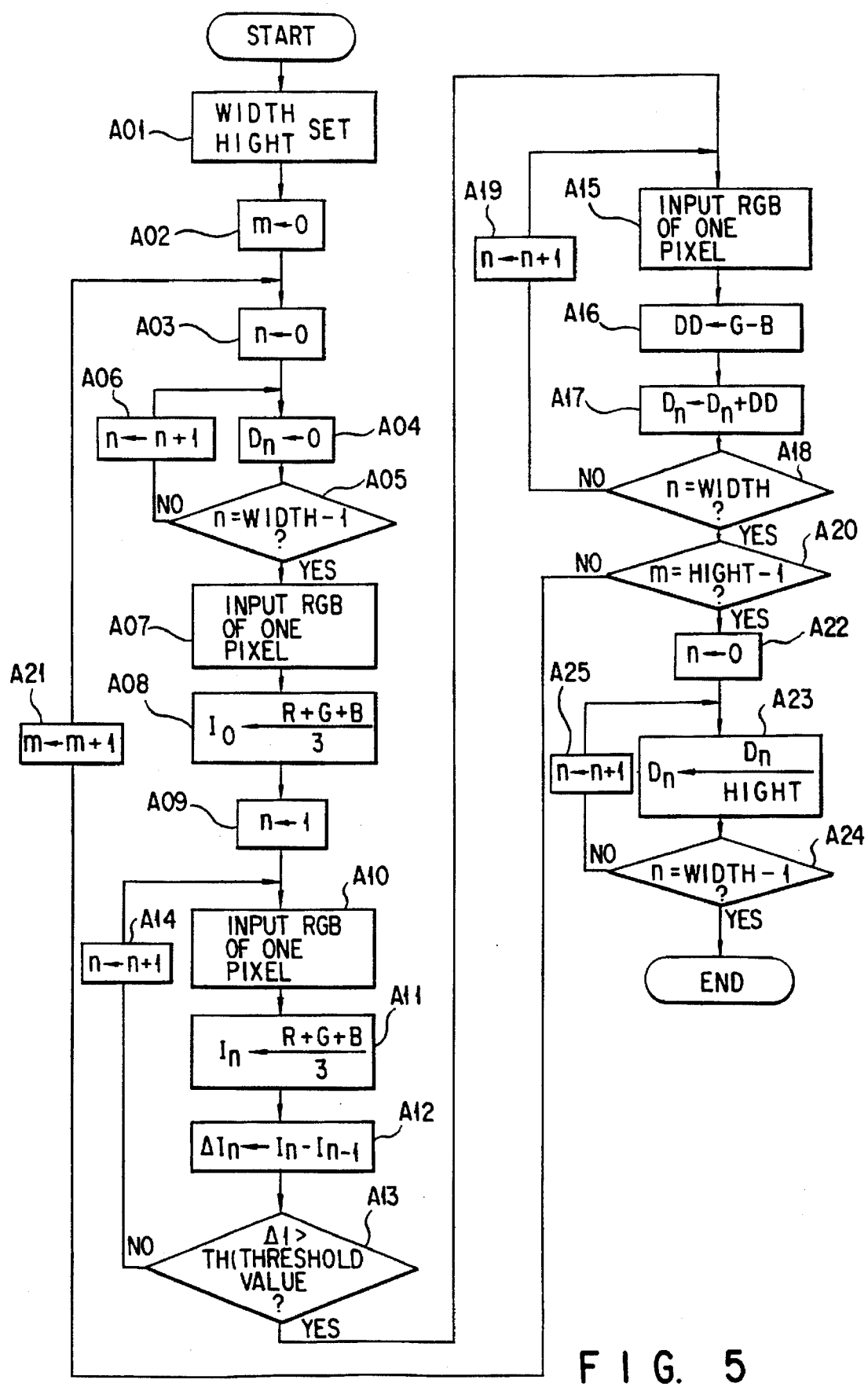
FIG. 5 is a flowchart showing the process of the readout processing section in the image processing apparatus according to the first embodiment of the present invention.

Next, the readout process of the specified information embedded by the above procedure is explained with reference to the flowchart of FIG. 5.

First, the sampling number WIDTH in the main scanning direction and the line number HIGHT in the sub-scanning direction are set (step A01). At this time, the sampling number WIDTH in the main scanning direction is so set that the width thereof will become smaller than that of the original sheet. For example, the line number HIGHT=128 is set. Assume that the count number in the main scanning direction is n and the count number in the sub-scanning direction is m. First, m is set to "0" (step A02) and n is set to "0" (step A03). The n-th total value Dn which will be described later is set to "0" (step A04). Whether n is equal to "WIDTH—1" or not is checked (step A05). If it is "NO", "1" is added to the present value of n (step A06) and then the step A04 is effected again. If it is "YES", the next step is effected.

After this, an RGB signal for one pixel is taken (step A07), the total sum of R, G, B is divided by 3 to derive an average value of the RGB signal so as to derive brightness data 10 of the pixel at which n=0 (step A08). Next, n is set to "1" (step A09). $I_n$ the same manner as described above, an RGB signal for one pixel is taken (step A10), the total sum of R, G, B is divided by 3 to derive an average value of the RGB signal so as to derive brightness data $I_n$ of an n-th pixel (step A11). Next, a difference $\Delta I_n$ between brightness data $I_n$ of the n-th pixel and brightness data $I_n-1$ of the (n−1)th pixel is derived (step A12). Whether $\Delta I_n$ is larger than a predetermined threshold value "TH" or not is checked (step A13). If it is "NO", "1" is added to the present value of n (step A14) and then the steps A10 to A12 are effected again. If it is "YES", the next step is effected. In this case, if the difference $\Delta I_n=I_n-I_n-1$ is considered as a differential value, an n-th pixel which lies at a point at which the differential value varies significantly, that is, $\Delta I_n$ takes a value larger than the threshold value TH is used as a starting pixel used for actual averaging. An pixel used as a starting pixel is treated as a first pixel before $\Delta I_n$ takes a value larger than the threshold value TH.

First, an RGB signal of a starting pixel is taken (step A15). Then, a color difference DDi (where, i: from 1 to n) between G and B, i.e., color difference component in a G—B direction is derived (step A16). The thus derived color difference DDi is added to the present total value Dn (at first, Dn=0). Thus, the total value Dn is updated (step A17). Next, whether n is equal to "WIDTH" or not is checked (step A18). If it is "NO", "1" is added to the present value of n (step A19) and the steps A15 to A17 are repeated. If it is "YES", the next step is effected. Next, whether m is equal to "HIGHT—1" or not is checked (step A20). If it is "NO", "1" is added to the present value of m (step A21) and the steps A03 to A19 are repeated. If it is "YES", the next step is effected. As a result, the total value of color differences DD for the n-th pixels in the respective lines is obtained.

The present value of n is set to "0" (step A22). The present total value Dn is divided by the line number "HIGHT" to derive an average value and the average value is set as Dn (step A23). Next, whether n is equal to "WIDTH—1" or not is checked (step A24). If it is "NO", "1" is added to the present value of n (step A25) and the step A23 is effected again. If it is "YES", the process is terminated.

Thus, the average value of the color difference for each pixel is derived.

After this, in order to extract the frequency component of the pattern representing the specified information, the derived average value (average value data) of the color difference is subjected to the filtering process by use of a band-pass filter. As a result, the DC component corresponding to the averaged original image information is eliminated and only the embedded specified information of a high frequency can be extracted. Note that it is also possible to use a high-pass filter instead of the band-pass filter.

The resolution of the scanner is sufficient if the printed original sheet can be read for each image dot. Therefore, if a scanner which can reproduce a normal image is used, the specified information can be easily extracted according to the above procedure.

Figure 20A:
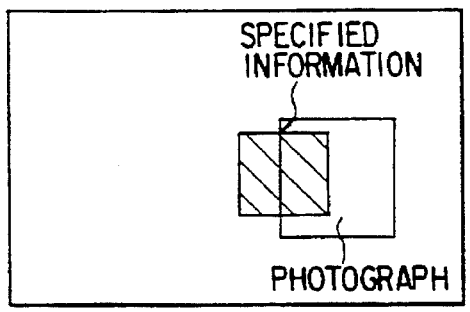
FIGS. 20A to 20D are diagrams showing cases wherein this invention is applied to an ID card having a photograph recorded therein in the first to seventh embodiments.
Figure 20B:
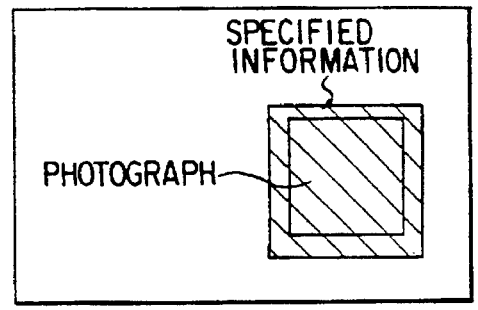
Figure 20C:
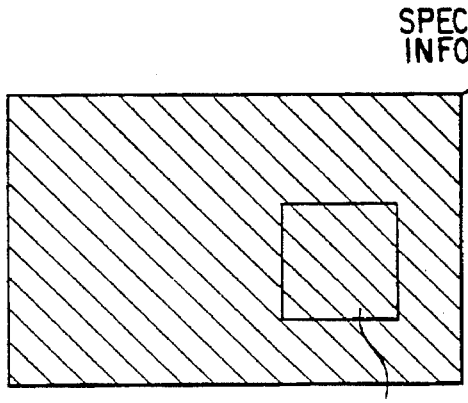
Figure 20D:
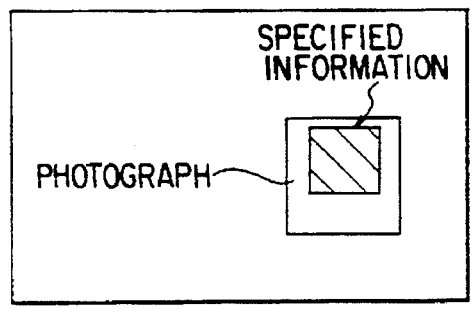

Next, an example of a case wherein the first embodiment of this invention is applied to an ID card having a photograph contained therein is explained. When specified information is embedded into an ID card, it is desirable to overlap a portion of the embedded specified information on the photograph as shown in FIG. 20A, for example. This is because, in a case that the photograph is changed and the ID card is forged by a third party, this fact can be easily discovered. As the specified information embedding range, the ranges shown in FIGS. 20B and 20C may be used in addition to the range shown in FIG. 20A.

Embedding of specified information into the ID card or the like is not limited to the first embodiment and can be applied in the second to tenth embodiments which will be described later.

As specified information to be embedded, data capacity of 20 digits at maximum, that is, approx. 65 bits is necessary. For example, an identification number of typical credit card, which is represented by larger number of digits than that of any other ID card, is represented by 20 digits (16 digits of card No. and 4 digits of secret No.). According to the present invention, however, the above digit number can be sufficiently achieved, since the present embodiment ensures 72-bit data capacity.

Further, a larger amount of specified information can be recorded by including the embedding position of the pattern into a portion of the specified information.

As described above, according to the first embodiment of this invention, a larger amount of specified information can be embedded for a smaller unit area without giving unnatural sense of vision. Further, the specified information can be easily extracted.

In addition, in the first embodiment, it is possible to directly embedding the specified information into the color signals without using the first and second conversion circuits. That is, by substituting the equations (1) to (4) into I, C1, C2, CC2 of the equations (5) to (7), the following equations are obtained.

$$Y'=Y\pm\alpha/3 \quad (9)$$

$$M'=M\mp\alpha/6 \quad (10)$$

$$C'=C\mp\alpha/6 \quad (11)$$

Therefore, the second color signals Y', M', C' can be obtained from the first color signals Y, M, C with satisfying the equations (9) to (11).

It is also possible to embedding different types of specified information for each of 128 lines, since averaging for the 128 lines is effected at the reading time.

In case of directly embedding the specified information into the color signals without using the first and second conversion circuit, the embedding processing section is composed as shown in FIG. 22. Like the first embodiment, specified information is generated by a code generator 2202 and a pattern signal formed of rectangular waveform is generated by a pattern generating circuit 2203. In this case, an amplitude of the pattern signal which is to be given in the direction of color difference is $\pm\alpha/2$. In a signal converting circuit 2204, the pattern signal is converted into a variation signals which is adequate to add on a first color signals Y, M, C supplied from a input system 2201. The variation signals DY, DM, DC to be added to the first color signals are expressed by the following equations.

$$DY=\pm\alpha/3 \quad (12)$$

$$DM=\mp\alpha/6 \quad (13)$$

$$DC=\mp\alpha/6 \quad (14)$$

The variation signals obtained by the above equations are supplied to a adder 105 and second color signals Y', M', C' are obtained.

It is possible to including the function of the present invention in a general printer, a facsimile machine, or the like by way of incorporating a medium such as add-on ROM board. In this case, the medium includes a code generating/adding section 220a constructed by the code generator 2202, the pattern generating circuit 2203, the signal converting circuit 2204, and the adder 2205.

Other embodiments are explained hereinafter. In the other embodiments, with reference to the similar portions, the same reference numbers are given and detailed explanation thereof is omitted.

In the first embodiment, a variation is caused in the color difference direction when the specified information is embedded. As is clearly seen from FIG. 3, the merit obtained by giving a variation in the chroma direction to embed the specified information is that the visual sensitivity of a man is lower for a variation in the color difference (blue—yellow) direction than for a variation in the luminance direction, but the sensitivity is further lower for a variation in the chroma direction than for a variation in the color difference direction. Next, the second embodiment wherein a variation is given not in the color difference direction but in the chroma direction is therefore explained.

Figures 6, 7:
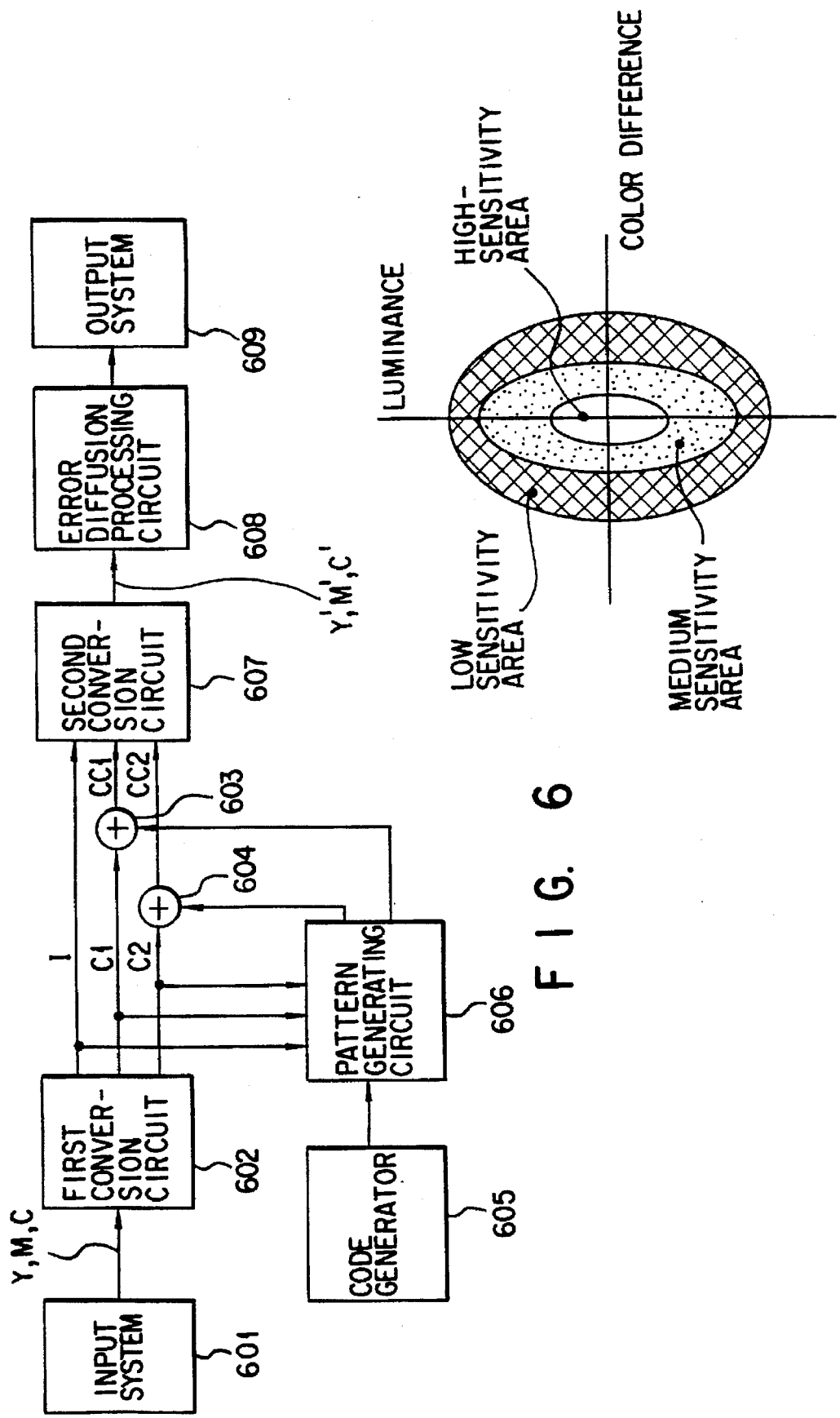
FIG. 6 is a block diagram showing an embedding processing section in an image processing apparatus according to second and fifth embodiments of the present invention.
FIG. 7 is a graph showing the distribution of the sensitivity of a human being for a pattern of the same period.

FIG. 6 is a block diagram showing an embedding processing section in an image processing apparatus according to the second embodiment of this invention.

As shown in FIG. 6, an input system 601 is provided in the embedding processing section. First color signals Y, M, C corresponding to the recorded color image are supplied from the input system 601 to a first conversion circuit 602. The first conversion circuit 602 effects the first converting operation based on the first color signals Y, M, C supplied from the input system 601 so as to create a luminance signal I and two color difference signals C1, C2. The construction described so far is the same as that in the case of the first embodiment. The luminance signal I is supplied to a second conversion circuit 607 and a pattern generating circuit 606. The color difference signal C1 is supplied to a first adder 603 and the pattern generating circuit 606. The color difference signal C2 is supplied to a second adder 604 and the pattern generating circuit 606.

Further, like the first embodiment, a code generator 605 is provided in the embedding processing section. The code generator 605 holds specified information to be embedded in the color image, generates the specified information in a coded form, and supplies the same to the pattern generating circuit 606. The pattern generating circuit 606 generates two pattern signals formed of rectangular waveform based on the code supplied from the code generator 605 and the luminance signal I and color difference signals C1, C2 supplied from the first conversion circuit 602 and supplies the same to the first adder 603 and second adder 604. In the process of generating pattern signals, the chroma of the image is derived.

The first adder 603 adds (or subtracts) a pattern signal from the pattern generating circuit 606 to (or from) a color difference signal C1 from the first conversion circuit 602. A signal CC1 obtained as the result of addition is supplied to the second conversion circuit 607. The second adder 604 adds (or subtracts) a pattern signal from the pattern generating circuit 606 to (or from) a color difference signal C2 from the first conversion circuit 602. A signal CC2 obtained as the result of addition is supplied to the second conversion circuit 607. The second conversion circuit 607 effects the second converting operation based on the luminance signal I from the first conversion circuit 602, the signal CC1 from the adder 603, and the signal CC2 from the adder 604 so as to create second color signals Y', M', C'. The second color signals Y', M', C' are supplied to an error diffusion processing circuit 608. The error diffusion processing circuit 608 subjects the received second color signals Y', M', C' to the error diffusion process to create an error diffusion pattern. The generated error diffusion pattern is supplied to an output system 609. The output system 609 is a printer, for example, and outputs an image based on the received error diffusion pattern. It is also possible to construct the system without using the error diffusion processing circuit 608. In this case, the second color signals Y', M', C' are directly supplied from the second conversion circuit 607 to the output system 609. The output system 609 outputs an image corresponding to the second color signals Y', M', C'.

Next, the operation of the second embodiment is explained.

First, like the case of the first embodiment, the first color signals Y, M, C corresponding to the color image are supplied to the first conversion circuit 602 from the input system 601. In the first conversion circuit 602, the first color signals Y, M, C supplied from the input system 601 are converted into the luminance signal I, color difference signals C1, C2 according to the equations (1) to (3) explained in the first embodiment. The luminance signal I and the color difference signals C1, C2 are supplied from the first conversion circuit 602 to the pattern generating circuit 606.

Further, in the code generator 605, the specified information is generated in a coded form and supplied to the pattern generating circuit 606. Next, in the pattern generating circuit 606, two pattern signals are generated based on the code. The generated pattern signals are added to the color difference signal C1 in the first adder 603 and added to the color difference signal C2 in the second adder 604. In this case, in the pattern generating circuit 606, a preset amount of pattern signal having the same component as a vector made by the color difference signals C1, C2 is generated. That is, if an amount (amplitude) of specified information to be embedded is expressed by $\pm\alpha/2$, signals CC1, CC2 obtained after addition of the pattern signals to the color difference signals C1, C2 are expressed by the following equations.

$$CC1 = C1 \pm \alpha \cdot C1/(2Cc) \tag{15}$$

$$CC2 = C2 \pm \alpha \cdot C2/(2Cc) \tag{16}$$

Cc expresses the chroma of an input image. Cc is derived by the following equation.

$$Cc = SQRT\{(C1)^2 + (C2)^2\} \tag{17}$$

The procedure effected after this to derive the second color signals Y', M', C' to be supplied to the output system is the same as in the first embodiment.

Since both of the color difference signals C1, C2 are "0" when an input image is a monochromatic image, the chroma direction for most of the image dots in the image plane cannot be determined. Therefore, it becomes difficult to embed the specified information. In order to solve this problem, the process is changed to embed the specified information in the color difference direction of Y—M in a case where both of the color difference signals C1, C2 are kept within a preset range and an input image is regarded as a monochromatic image. That is, the distribution of the chroma Cc in the image plane is derived, and if the range of the distribution remains within a preset range, the color difference signal C1 is kept unchanged and only the color deference signal C2 is changed. That is, a signal CC2 obtained after the pattern signal is added to the color difference signal C2 is expressed by the following equation.

$$CC2 = C2 \pm \alpha/2 \tag{18}$$

The process expressed by the equation (18) is the same as that in the case of the first embodiment.

Alternatively, it is possible to prevent the process for embedding the specified information from being effected in a case where both of the color difference signals C1, C2 are kept within a preset range and an input image is regarded as a monochromatic image.

Further, the human eyes sometimes become sensitive to a color near the achromatic color. Therefore, if the specified information is not embedded in a portion near the achromatic color, it becomes possible to make it difficult for a man to identify the specified information.

It is necessary to set the amplitude and period of the embedded specified information by taking the limit of the visual sense of a man into consideration. In this case, a pattern appearing on the image plane becomes less significant to the human eyes as the amplitude thereof is smaller and the period thereof is shorter.

Further, as is clearly understood from FIG. 3 which is explained in the first embodiment, there is no possibility that the pattern will be identified by the human eyes even if the amplitude is set to a relatively large value. Since the amplitude of the pattern itself is large, the possibility that it is erased by noises is low. Therefore, even if a sensor with high S ratio is not used, the pattern can be easily extracted.

The signal CC1 created by the adder 603 is supplied to the second conversion circuit 607. Further, the signal CC2 created by the adder 604 is supplied to the second conversion circuit 607. Then, the luminance signal I, color difference signal C1 and signal CC2 are converted into second color signals Y', M', C' by the second conversion circuit 607. In this case, the conversion is effected according to the equations (5) to (7) as explained in the first embodiment. In this conversion, it is considered that C1 in the equations (5) to (7) is replaced with CC1.

Thus, an image having the specified information embedded therein is obtained.

The thus derived second color signals Y', M', C' are supplied to the error diffusion processing circuit 608. In the error diffusion processing circuit 608, an error diffusion pattern is created.

In the output system 609, as shown in FIG. 2B, 9-byte data corresponding to the specified information is repeatedly embedded in the main scanning direction and precisely the same pattern is repeatedly embedded in the sub-scanning direction. Thus, the specified information is embedded in the image information and printed.

Now, the technique for permitting a large amount of specified information to be embedded is explained. With this technique, the amount of specified information to be embedded is controlled and changed according to the chromaticity of an input image.

FIG. 7 is a schematic diagram showing the distribution of the sensitivity of an observer to the respective chromaticities for a pattern of the same period obtained as the result of study thereon. In FIG. 7, the color difference is taken on the abscissa and the luminance is taken on the ordinate. The area in which the painted color is lighter indicates the higher sensitivity. As is clearly seen from FIG. 7, when a pattern is embedded in a portion which has the low color difference and the intermediate luminance, the pattern can be relatively easily identified by the human eyes. Therefore, it is necessary to effect the control so as to prevent the pattern from being embedded in a color of high-sensitivity chromaticity area corresponding to the core which is not painted, or suppress the amplitude of the pattern in this area and enlarge the amplitude of the embedded pattern as the sensitivity becomes lower.

In this case, a memory (not shown) for storing amplitude coefficients for determining the amount of addition of pattern signals is provided in the pattern generator 606 shown in the block diagram of FIG. 6. The pattern generator 606 fetches an adequate amplitude coefficient from the memory according to the luminance signal I and color difference signals C1, C2 supplied from the first conversion circuit 602. At this time, an LUT (Look Up Table) is referred to, for example. Then, the pattern generator 606 changes the amplitudes of the pattern signals to be respectively added to the color difference signals C1, C2 according to the amplitude coefficient fetched from the memory. That is, the pattern generator 606 generates pattern signals so as to prevent the pattern signals from being added in a high-sensitivity area near the achromatic color or suppress the amplitude thereof to a small value. Thus, the pattern signals are added to the color difference signals C1 and C2 in the adders 603 and 604, respectively. If the amplitude coefficient is expressed by β, the color difference signals CC1, CC2 are expressed by the following equations.

$$CC1 = C1 \pm \alpha \cdot \beta \cdot C1/(2Cc) \quad (19)$$

$$CC2 = C2 \pm \alpha \cdot \beta \cdot C2/(2Cc) \quad (20)$$

As a result, it becomes possible to embed a larger amount of specified information and make it more difficult to visually identify the embedded specified information.

Next, the process for reading out specified information output in the above procedure is explained.

In the readout processing section of this apparatus, a scanner (not shown) for reading specified information from an image printed by the process of the above embedding processing section is provided. The scanner has an RGB (Blue, Green, Yellow) color separation filter mounted thereon.

The specified information reading process is similar to that of the first embodiment. However, the process is partly different from the process explained in the first embodiment. Referring to FIG. 5, a color difference DD (color difference component in the G—B direction) between G and B is derived in the step A16 of the first embodiment. On the other hand, in the step A16 of the second embodiment, the chroma DD is derived by calculating $SQRT\{(G-B)^2+(R-B)^2\}$. Further, in the first embodiment, the color difference DD is added to the total value Dn in the step A17. On the other hand, in the second embodiment, the chroma DD is added to the total value Dn in the step A17. The procedure other than the above steps is the same as that of the first embodiment. As a result, the average of color differences for the respective pixels can be derived.

After this, the derived average of chroma (average value data) is subjected to the filtering process by a band-pass filter in order to extract the frequency component of the pattern. As a result, the DC component, that is, the averaged original image information is eliminated and only the embedded specified information can be extracted.

The resolution of the scanner is sufficient if the printed original can be read for each image dot. Therefore, if a scanner which can reproduce a normal image is used, the specified information can be easily extracted according to the above procedure.

As described above, according to the second embodiment, it becomes possible to make it more difficult to visually identify the specified information and embed a larger amount of specified information in comparison with the first embodiment. Further, the specified information can be easily extracted.

In addition, in the second embodiment, it is possible to directly embedding the specified information into the color signals without using the first and second conversion circuit. That is, the second color signals Y', M', C' can be derived from the first color signals Y, M, C using the equations (1) to (3), (5) to (7), and (15) to (17). In this case, the variation signals DY, DM, DC (being generated by the signal generating circuit 2204 in FIG. 22) to be added to the first color signals are expressed by the following equations.

$$DY = \pm \alpha(2Y-M-C)/\{6 \cdot SQRT((M-C)^2+(Y-M)^2)\} \quad (21)$$

$$DM = \pm \alpha(2M-C-Y)/\{6 \cdot SQRT((M-C)^2+(Y-M)^2)\} \quad (22)$$

$$DC = \pm \alpha(2C-Y-M)/\{6 \cdot SQRT((M-C)^2+(Y-M)^2)\} \quad (23)$$

Next, a third embodiment is explained.

Generally, when a small variation is given to a portion in which a variation in the density of an image is even, the corresponding portion becomes visually significant, but when a variation is given to a portion in which a variation in the density is large, the corresponding portion will not become visually significant. In this embodiment, this property is utilized. That is, when a variation in the density of the image is large, specified information is intensely embedded, and specified information is weakly embedded in a portion in which a variation in the density is even.

FIG. 8 is a block diagram showing an embedding processing section in an image processing apparatus according to a third embodiment of this invention.

As shown in FIG. 8, an input system 801 is provided in the embedding processing section. First color signals Y, M, C, K(black) corresponding to the recorded color image are supplied from the input system 801 to a first conversion circuit 802. The first conversion circuit 802 effects the first converting operation based on the first color signals Y, M, C, K supplied from the input system 801 so as to create a luminance signal I and two color difference signals C1, C2. The luminance signal I is supplied to a second conversion circuit 809, high frequency extracting circuit 807 and pattern generating circuit 806. The color difference signal C1 is supplied to a first adder 803 and the pattern generating circuit 806. The color difference signal C2 is supplied to a second adder 804 and the pattern generating circuit 806.

Further, a code generator 805 is provided in the embedding processing section. The code generator 805 holds specified information to be embedded in the color image, generates the specified information in a coded form, and supplies the same to the pattern generating circuit 806. The pattern generating circuit 806 generates a pattern signal of rectangular waveform, as shown in FIG. 2A, based on the code supplied from the code generator 805 and the luminance signal I and color difference signals C1, C2 supplied from the first conversion circuit 802 and supplies the same to multipliers 808a and 808b. The high frequency extracting circuit 807 effects the high frequency component extracting process which is well known in the art in response to the luminance signal I supplied from the first conversion circuit 802, derives a coefficient k for determining the amplitude of the pattern signal according to the intensity of the high frequency component and supplies the same to the multipliers 808a and 808b. The multiplier 808a multiplies the pattern signal from the pattern generating circuit 806 by a coefficient k from the high frequency extracting circuit 807 and supplies an output to the first adder 803. Similarly, the multiplier 808b multiplies the pattern signal from the pattern generating circuit 806 by a coefficient k from the high frequency extracting circuit 807 and supplies an output to the second adder 804.

The first adder 803 adds (or subtracts) a signal from the multiplier 808a to (or from) a color difference signal C1 from the first conversion circuit 802. A signal CC1 obtained as the result of addition is supplied to the second conversion circuit 809. The second adder 804 adds (or subtracts) a signal from the multiplier 808b to (or from) a color difference signal C2 from the first conversion circuit 802. A signal CC2 obtained as the result of addition is supplied to the second conversion circuit 809. The second conversion circuit 809 effects the second converting operation based on the luminance signal I from the first conversion circuit 802, the signal CC1 from the adder 803, and the signal CC2 from the adder 804 so as to create second color signals Y', M', C'. The second color signals Y', M', C' are supplied to an error diffusion processing circuit 810. The error diffusion processing circuit 810 subjects the received second color signals Y', M', C' to the error diffusion process to create an error diffusion pattern. The generated error diffusion pattern is supplied to an output system 811. The output system 811 is a printer, for example, and outputs an image based on the received error diffusion pattern.

Next, the operation of the third embodiment is explained.

First, the first color signals Y, M, C, K corresponding to the color image are supplied to the first conversion circuit 802 from the input system 801. In the first conversion circuit 802, the first color signals Y, M, C, K supplied from the input system 801 are converted into the luminance signal I and color difference signals C1, C2. The luminance signal I and the color difference signals C1, C2 are supplied from the first conversion circuit 802 to the pattern generating circuit 806.

In this case, the conversion from the first color signals Y, M, C, K to the luminance signal I and color difference signals C1, C2 is effected according to the following equations.

$$I = 1-((Y+M+C)/3+K) \quad (24)$$

$$C1 = M-C \quad (25)$$

$$C2 = Y-M \quad (26)$$

In the code generator 805, specified information is generated in a coded form and supplied to the pattern generating circuit 806. Next, in the pattern generating circuit 806, two pattern signals are generated based on the above code. In this case, in the pattern generating circuit 806, a preset amount of pattern signal having the same component as a vector made by the color difference signals C1, C2 is generated. Further, the conversion relation between the color difference signals obtained before and after the specified information is embedded is the same as that expressed by the equations (15) to (17) explained in the second embodiment.

Like the case of the second embodiment, the pattern generating circuit 806 contains a memory (not shown) for storing amplitude coefficients for determining the amount of addition of pattern signals. The pattern generator 806 fetches an adequate amplitude coefficient from the memory according to the luminance signal I and color difference signals C1, C2 supplied from the first conversion circuit 802. At this time, an LUT is referred to, for example. Then, the pattern generator 806 changes the amplitudes of the pattern signals to be respectively added to the color difference signals C1, C2 according to the amplitude coefficient fetched from the memory. That is, the pattern generating circuit 806 generates pattern signals so as to prevent the pattern signals from being added in a high-sensitivity area near the achromatic color, for example, or suppress the amplitude thereof to a small value.

The amplitude of the generated pattern signals are further controlled in the multipliers 808a and 808b by the coefficient k from the high frequency extracting circuit 807 and then the pattern signals are supplied to the first adder 803 and second adder 804. In this case, if a less high frequency component is extracted, for example, the amplitude is suppressed to a small value by the coefficient k. The pattern signal after multiplication is added to the color difference signal C1 in the first adder 803 and to the color difference signal C2 in the second adder 804. Then, in the second conversion circuit 809, the color signals Y', M', C', K' to be supplied to the output system are derived.

In this case, conversion into the second color signals is effected according to the following equations.

$$Y' = 1-(I+K)+(CC1+2 \cdot CC2)/3 \quad (27)$$

$$M' = 1-(I+K)+(CC1-CC2)/3 \quad (28)$$

$$C' = 1-(I+K)-(2 \cdot CC1+CC2)/3 \quad (29)$$

Thus, the second color signals Y', M', C', K' representing a color image into which specified information is embedded can be obtained.

After this, they are subjected to the pseudo-half tone representation process in the error diffusion processing circuit 810 and output to the output system 811.

The specified information reading procedure is the same as that in the first embodiment.

As described above, in the third embodiment, the amplitude of a pattern to be embedded is made large in a portion of an image in which a large amount of high frequency component lies and a variation is significant, and the amplitude of a pattern to be embedded is made small in a portion of the image in which only a small amount of high frequency component lies and a variation is less significant. As a result, it becomes possible to make it more difficult to visually identify the embedded specified information and embed a larger amount of specified information in comparison with a case of the second embodiment. Further, the specified information can be easily extracted.

In the present invention, it is not always necessary to vary the amplitude in accordance with visual sensitivity.

In addition, in the third embodiment, it is possible to directly embedding the specified information into the color signals without using the first and second conversion circuit. That is, the second color signals Y', M', C', K' can be derived from the first color signals Y, M, C, K using the former equations. In this case, the variation signals DY, DM, DC, DK (being generated by the signal generating circuit 2204 in FIG. 22) to be added to the first color signals are expressed by the following equations.

$$DY=\pm \alpha/3 \tag{30}$$

$$DM=\mp \alpha/6 \tag{31}$$

$$DC=\mp \alpha/6 \tag{32}$$

$$DK=0 \tag{33}$$

Next, a fourth embodiment is explained.

In the first embodiment, a case where primaries Y, M, C of substructive mixture are used is explained. In this fourth embodiment, a case where primaries R, G, B of additive mixture are used is explained. The fourth embodiment is the same as the first embodiment except for color primaries of color signals. That is, in FIG. 1, first color signals R, G, B (not Y, M, C) are supplied from the input unit 101 to the first conversion circuit 102, and second color signals R', G', B' (not Y', M', C') are supplied from the second conversion circuit 106 to the error diffusion processing circuit 107.

The conversion from the first color signals R, G, B to the luminance signal I and color difference signals C1, C2 is effected according to the following equations.

$$I=(R+G+B)/3 \tag{34}$$

$$C1=R-G \tag{35}$$

$$C2=G-B \tag{36}$$

Next, the color difference signal CC2 added the pattern signal can be expressed by the above equation (4).

In this case, the conversion into the second color signals is effected according to the following equations.

$$R'=I+(2 \cdot C1+CC2)/3 \tag{37}$$

$$G'=I+(-C1+CC2)/3 \tag{38}$$

$$B'=I+(-C1-2 \cdot CC2)/3 \tag{39}$$

Thus, the second color signals R', G', B' representing a color image into which specified information is embedded can be obtained.

In addition, in the fourth embodiment, it is possible to directly embedding the specified information into the color signals without using the first and second conversion circuits. That is, the second color signals R', G', B' can be derived from the first color signals R, G, B using the former equations. In this case, the variation signals DR, DG, DB (being generated by the signal generating circuit 2204 in FIG. 22) to be added to the first color signals are expressed by the following equations.

$$DR=\pm \alpha/6 \tag{40}$$

$$DG=\pm \alpha/6 \tag{41}$$

$$DB=\alpha/3 \tag{42}$$

Next, a fifth embodiment is explained.

In the second embodiment, a case where subtractive primaries Y, M, C are used is explained. In this fifth embodiment, a case where additive primaries R, G, B are used is explained. The fifth embodiment is the same as the second embodiment except for color primaries of color signals. That is, in FIG. 6, first color signals R, G, B (not Y, M, C) are supplied from the input unit 601 to the first conversion circuit 602, and second color signals R', G', B' (not Y', M', C') are supplied from the second conversion circuit 607 to the error diffusion processing circuit 608.

The conversion from the first color signals R, G, B to the luminance signal I and color difference signals C1, C2 is effected according to the above equations (34) to (36).

The signals CC1, CC2 obtained after addition of the pattern signals to the color difference signals C1, C2 are expressed by the above equations (15) to (17).

In this case, the conversion into the second color signals is effected according to the following equations.

$$R'=I+(2 \cdot CC1+CC2)/3 \tag{43}$$

$$G'=I+(-CC1+CC2)/3 \tag{44}$$

$$B'=I+(-CC1-2 \cdot CC2)/3 \tag{45}$$

Thus, the second color signals R', G', B' representing a color image into which specified information is embedded can be obtained.

In addition, in the fifth embodiment, it is possible to directly embedding the specified information into the color signals without using the first and second conversion circuits. That is, the second color signals R', G', B' can be derived from the first color signals R, G, B using the former equations. In this case, the variation signals DR, DG, DB (being generated by the signal generating circuit 2204 in FIG. 22) to be added to the first color signals are expressed by the following equations.

$$DR=\pm \alpha(2R-G-B)/\{6 \cdot SQRT((R-G)^2+(G-B)^2)\} \tag{46}$$

$$DG=\pm \alpha(2G-B-R)/\{6 \cdot SQRT((R-G)^2+(G-B)^2)\} \tag{47}$$

$$DB=\pm \alpha(2B-R-G)/\{6 \cdot SQRT((R-G)^2+(G-B)^2)\} \tag{48}$$

In the first to fifth embodiment, quite the same specified information is embedded in the sub-scanning direction. It is also possible to embedding different types of patterns for each of 128 lines so as to increase a amount of the specified information to be embedded, since averaging for the 128 lines is effected at the reading time. Further, a unit of the specified information is not limited to 7 bites and any number of bite can be taken.

Next, a sixth embodiment is explained.

In the above embodiments, a striped pattern which is obtained by varying amplitude of image data in accordance with the data to be embedded is superposed on a image. In the present embodiment, a plurality of frequency components on a two-dimensional Fourier transform plane are multiplexed in accordance with specified information data and a two-dimensional moire pattern having the multiplexed frequency components are added to a color image signal.

FIG. 9 is a block diagram showing an embedding processing section in an image processing apparatus according to the sixth embodiment of this invention.

As shown in FIG. 9, an input system 901 is provided in the embedding processing section. First color signals Y, M, C corresponding to the color image are supplied from the input system 901 to a first conversion circuit 902. The first conversion circuit 902 effects first converting operation based on the first color signals Y, M, C supplied from the input system 901 so as to create a luminance signal I and two color difference signals C1, C2. The first converting operation is the same as that in the first embodiment. The luminance signal I is supplied to a second conversion circuit 908. The color difference signal C1 which is one of the above two color difference signals C1, C2 is supplied to the second conversion circuit 908 and the color difference signal C2 is supplied to the second converting circuit 908 via a band elimination circuit 903 and an adder 907. The band elimination circuit 903 executes moving average process with 8×8 for the color difference signal C2 from the first conversion circuit 902 so as to eliminate information other than the image information. That is, the band eliminating operation is a low pass filter operation, in which only the image information components close to DC component can be extracted. This is because a specified information (having high-frequency component) may have been already embedded into the image signal supplied from the input system 901 by way of the present embedding process.

Further, a code generator 904 is provided in the embedding processing section. The code generator 904 holds specified information to be embedded in the color image, generates the specified information in a coded form, and supplies the same to an information processing section 905. The information processing section 905 processes a code supplied from the code generator 904 for encipherment or compression and supplies the result of processing to a pattern generating circuit 906. The pattern generating circuit 906 generates a pattern signal based on a code supplied from the information processing section 905 and supplies the same to the adder 907.

The adder 907 adds (or subtracts) a pattern signal from the pattern generating circuit 906 to (or from) a color difference signal C2 from the band elimination circuit 903. A signal CC2 obtained as the result of addition is supplied to the second conversion circuit 908. The second conversion circuit 908 effects the second converting operation based on the luminance signal I, the color difference signal C1 supplied from the first conversion circuit 902 and the signal CC2 supplied from the adder 907 so as to create second color signals Y', M', C'. The second color signals Y', M', C' are supplied to an output system 909. The output system 909 is, for example, a printer, a facsimile equipment, or a color copy machine, and outputs a color image based on the received second color signals Y', M', C'.

Next, the operation of the sixth embodiment is explained.

First, the input first color signals Y, M, C are converted into a luminance signal I and color difference signals C1, C2. The conversion in this case are based on the equations (1) to (3). The color signals are expressed by a value ranging from 0 to 1, a case of Y=M=C=0 indicates white and a case of Y=M=C=1 indicates black.

Assume now that an input original or image data has specified information previously recorded therein by the technique based on the present embodiment. In this case, it is necessary to eliminate old information from a printed original or image data and extract only original image data. That is, the moving average of e.g. 8×8 for the color difference signal C2 is derived, and the value thereof is newly set as an image signal of C2 so as to extract only the color image signal. The number of pixels subjected to the averaging process depends on the number of pixels of the printer. Alternatively, it is possible to obtain only image data by effecting the Fourier transform in the color difference direction, extracting the embedded specified information, and eliminating only the extracted frequency component.

The specified information is embedded into this image data by the adder 907 and the second color signals Y', M', C are supplied to the output system 909 via the second conversion circuit 908. The conversion of the signals I, C1, C2 into the second color signals Y', M', C' is effected according to the equations (5) to (7) explained in the first embodiment.

Next, the process of embedding specified information is explained. The specified information is expressed by a numeric value such as code, which is the same as in the first embodiment. The value is previously subjected to the process such as encipherment or compression in the information processing section 905. As is clearly seen from FIG. 2 which is referred to in the first embodiment, the gradation identifying ability of a man is high for a variation in the luminance direction and low for a variation in the color difference (Y—M) direction. Also, in this embodiment, this property is utilized to embed specified information.

Figure 10A:
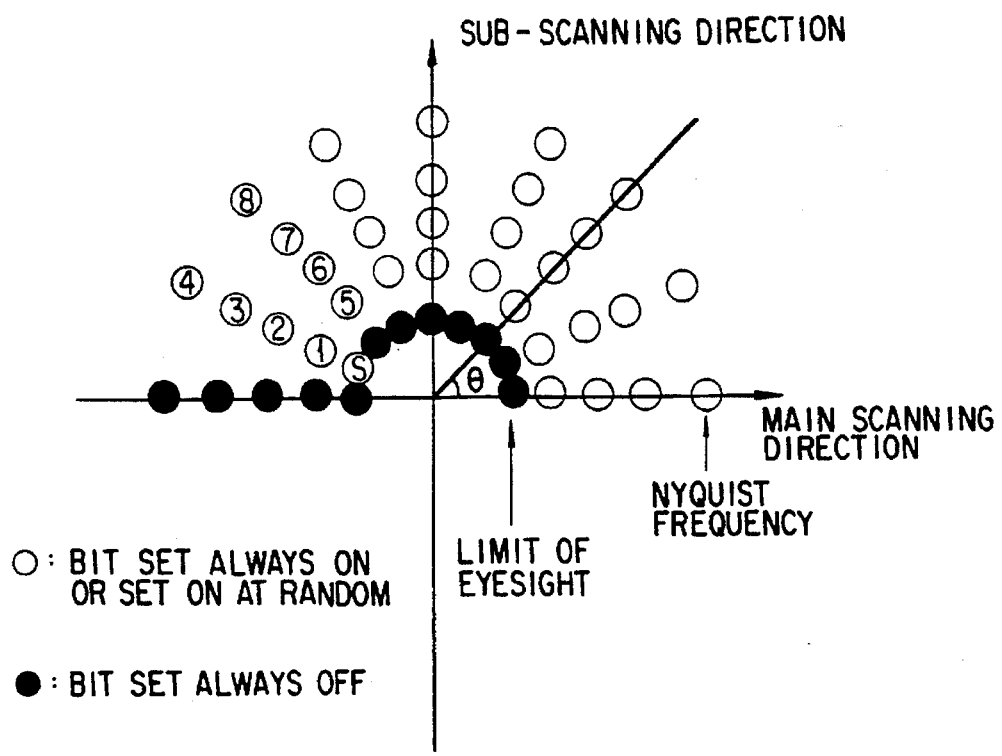
FIGS. 10A to 10C are diagrams showing the bit arrangement on a Fourier transform plane used in the sixth embodiment shown in FIG. 9.

As shown in FIG. 10A, a Fourier transform plane constructed by the main scanning direction axes and the sub-scanning direction axes is defined so as to generate pattern signal of moire pattern which has multiplexed frequency components. The Fourier transform plane has a plurality of points which are arranged thereon in accordance with some fixed rules and are corresponding to each bit data. Each of the points is given a period and an amplitude. By adding the period and the amplitude for each bit data, the embedded pattern is generated.

The code which is effected a process such as encipherment or compression by the information processing section 905 is supplied to the pattern generating circuit 906. When the code is supplied to the pattern generating circuit 906, the plurality of bits forming the code are sequentially arranged on the predetermined points of the Fourier transform plane. In this case, arranging point and order can be arbitrarily determined. In this embodiment, each bit is arranged with keeping a certain distance on a plurality of lines which are radially expanded. That is, the arranging points of bits draws a concentric circle whose center is set on the origin of the coordinate axes. If an angle made by the above line and the main scanning direction axes is expressed by θ, the value of the angle θ is given in the range of $0 \leq \theta < \pi$, and if the range is divided by n, $\theta = k/n \cdot \pi (k=0$ to $n-1)$. In this case, n (a number of divisions) can be set to a larger value as the period WL becomes smaller. That is, n can be set to a larger value, as the period becomes closer to 2 dot/cycle corresponding to the Nyquist frequency. Each bit is arranged between the point corresponding to the limit of eyesight and the point corresponding to the Nyquist frequency, with keeping a certain distance each other on each radial line.

In the Fourier transform plane, the period indicates a distance between the origin and the bit arranged point. The period becomes longer, as the point becomes closer to the origin. The period becomes shorter, as the point becomes far from the origin. The Nyquist frequency corresponds to the upper bound of the high-frequency component which can be expressed by the printer.

In order to specify a starting point for arranging bits, in the range of the limit of eyesight, as shown in FIG. 10A, bits except one bit are always set ON or OFF (in the sample of FIG. 10A, bits except one bit are set always OFF: 0) with no relation to the specified information. Bit S expressed by a white circle in which S is written is arranged on one exceptional point. The bit S is always set ON or OFF (in the sample of FIG. 10A, bit set always ON: 1). The thus bit S which is distinguished from another bits in the limit of eyesight is the starting bit (i.e., the starting bit for arranging another each bit of code data).

The bits are sequentially arranged in the radiating direction on one radiatinal line. If the arranged bit reaches the point corresponding to the Nyquist frequency, then θ is reduced and remaining bits are similarly arranged on the next radiational line. The numbers 1 to 8 . . . in the circles of bits of FIG. 10A indicate arranging orders. It is possible to arrange bits in order either from the most-significant-bit or from the least-significant-bit.

Figure 10B:
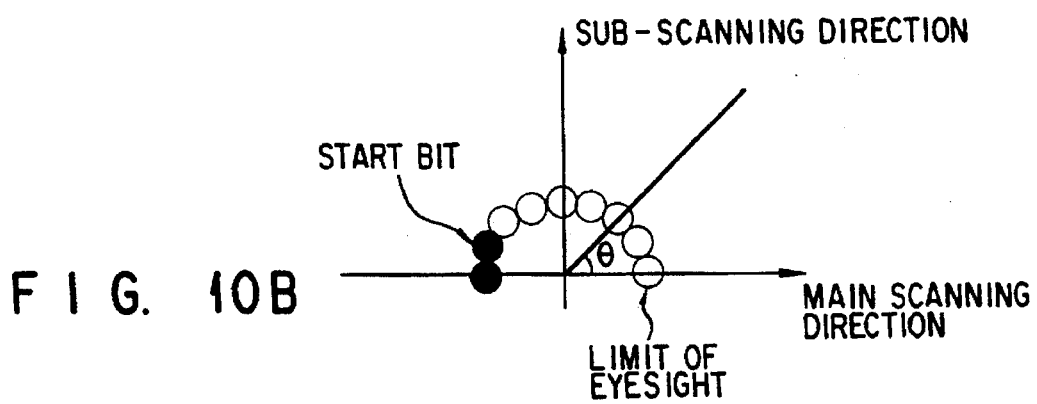
Figure 10C:
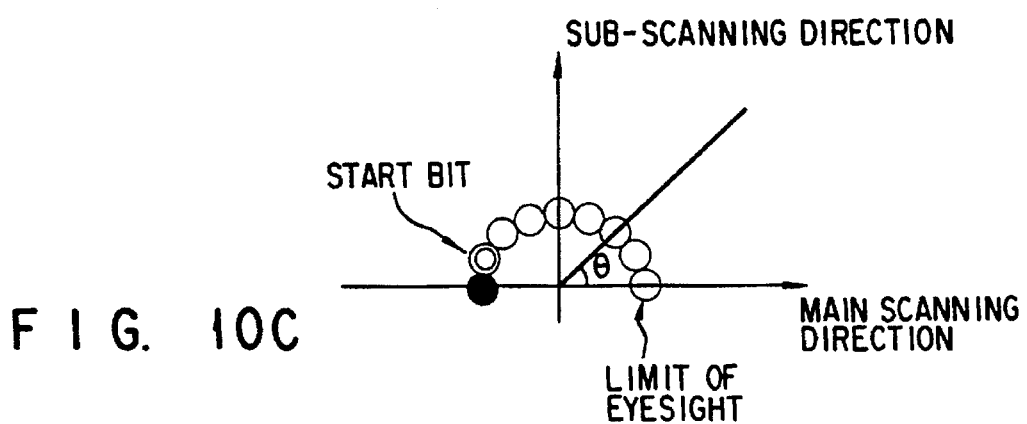

Thus, on the Fourier transform plane, a bit for identification of the starting point (i.e., a starting bit S being independent on the specified information) is always set ON (or OFF) in a low-frequency range which is less subject to deterioration, for example. Further, other examples of the start bit S are shown in FIGS. 10B and 10C. In either case, the arrangement in the limit of eyesight on the Fourier transform plane is shown, as a variation of FIG. 10A. Unlike the case of FIG. 10A, in a case of FIG. 10B, the starting bit S is always set OFF and the other bits are always set ON. In a case of FIG. 10C, all of the bits are always set ON and only the amplitude WI of the point (shown as white double circle) corresponding to the start bit is emphasized (e.g., doubled) so as to distinguish from other bits in the limit of eyesight.

The period and the amplitude of all bit data of the specified information arranged on the Fourier transform plane are added to the color image signal, in accordance with the pixel position x, y of the color image, on which the specified information is to be embedded.

The pattern generating circuit 906 thus generates specified information pattern $\Sigma\Sigma\beta(\theta, WL)$. $\Sigma\Sigma$ means the sum relative to θ (0≦θ<180°) and WL (period varying in the range between the limit of eyesight and the Nyquist frequency).

$$\Sigma\Sigma\beta(\theta, WL) = (WI/2) \cdot \cos(\cos\theta \cdot x \cdot 2\pi/WL + \sin\theta \cdot y \cdot 2\pi/WL) \quad (49)$$

In this case, WI/2 indicates an amplitude of each bit. If the bit indicates 0, then WI=0 and only the component of the bit indicating 1 is added. Therefore, CC2 of the output from the adder 907 is expressed by the following equation.

$$CC2 = C2 + \Sigma\Sigma\beta(\theta, WL) \quad (50)$$

Next, the procedure for determining values of period WL, angle θ, and amplitude WI is explained. First, roughly speaking, the period WL lies in the range between the "limit of eyesight" in the color difference direction in which specified information is to be embedded and the Nyquist frequency of the printer. However, the "limit of eyesight" is used for convenience and actually indicates the frequency of a point at which the sensitivity to a variation in the density abruptly drops. The "limit of eyesight" is a value which does not depend on the printer. The limit of eyesight in the color difference (Y—M) direction is e.g. 2 cycle/mm. Now, an attempt is made to derive a controlled variable of the printer corresponding to the above value. For example, if the printer used has a resolution of 400 dpi, one period of the limit of visual sense corresponds to approximately 8 pixels. Therefore, when the printer of the above resolution is used, the range of the period WL corresponds to 2 to 8 pixels. In this case, the period corresponding to 2 pixels implies the limit value which can be expressed by the printer.

The value of the amplitude WI is set by taking the MTF (modulation transfer function) characteristic of the output system and the visual sense for the periodic structure into consideration. That is, the identifying ability shown in FIG. 2 is referred to. For example, the value of the amplitude WI is set to a larger value as the component has a higher frequency such that WI is set to 1/64 if the period WL is equal to eight pixels, and WI is set to 1/4 if the period WL is equal to two pixels, thus enhancing the data efficiency. This is because the fact that the high-frequency component is influenced by the MTF characteristic of the output system and tends to be degraded is taken into consideration.

In addition, the number of divisions and the range of the period of the embedded pattern depend on the gradation number which can be expressed by the output system, the S ratio of the reading system or the like, the number of sampling pixels at the reading time and the like. Further, the angle (or the number of divisions) depends on the S ratio of the reading system or the like, the number of sampling pixels at the reading time and the like.

In this embodiment, a case wherein the period and angle are set at regular intervals on the Fourier transform plane is explained, but the arrangement is not necessarily made at regular intervals if a problem that it is difficult to attain data matching at the time of reading embedded specified information or the like does not occur. That is, although a concentric circle is drawn in the present embodiment, it is also possible to draw a concentric ellipse but an entire circle.

Most of the general color originals do not contain periodic components of high frequency in the color difference component. However, in some rare cases, the periodic component is contained in a line drawing or dot image. When specified information is embedded in such an image, a component which is not actually embedded is erroneously regarded as being embedded at the time of reading in some cases. In this case, erroneous determination can be prevented by treating a plurality of components as one bit. That is, at least one dummy bit having the same content as that of another bit is provided. In this case, the amount of specified information which can be embedded is reduced in accordance with the number of dummy bits.

Figure 11A:
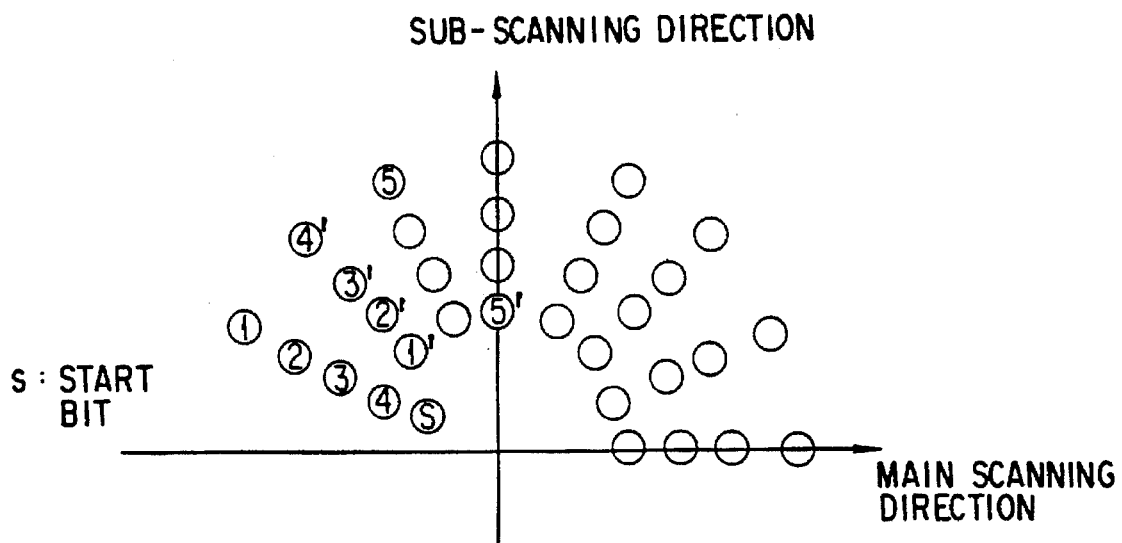
FIGS. 11A and 11B are diagrams showing the bit arrangement for prevention of erroneous determination on a Fourier transform plane used in the sixth embodiment shown in FIG. 9.
Figure 11B:
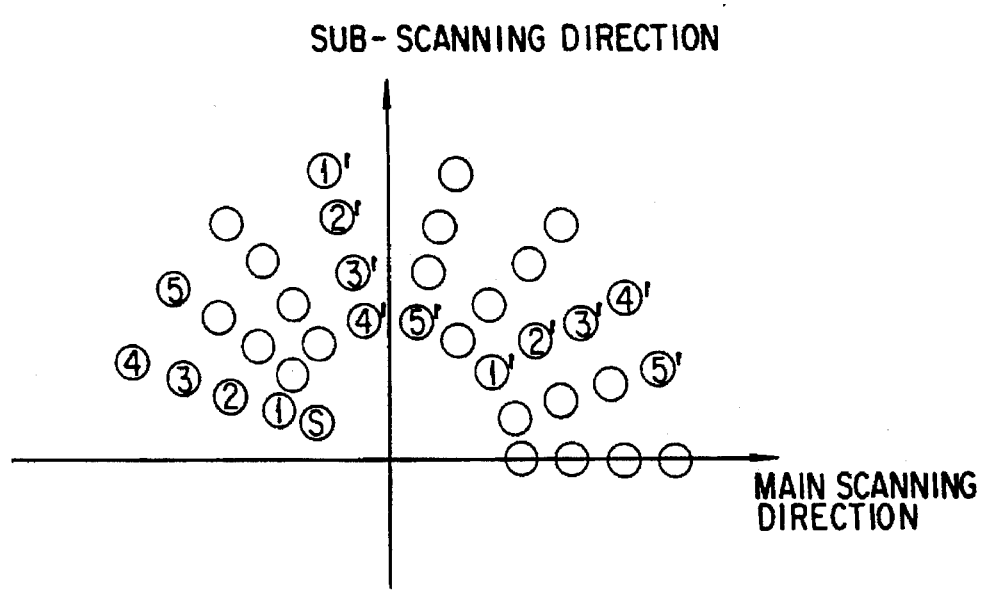

FIGS. 11A and 11B indicate the bit arrangement on the Fourier transform plane based on the above-described concept. In order to simplify the explanation, bits set always OFF are omitted in FIGS. 11A and 11B. A bit having the same number as that of another bit is identified to have the same content. In this case, the bit whose number is attached with dash is the dummy bit. FIG. 11A indicates an example in which the same bit is arranged on adjacent radially extending lines (two components are treated as one unit). That is, the bits in one line are arranged in the regular order and the bits in the other line are arranged in the reverse order. FIG. 11B indicates an example in which three lines are treated as one block and the same bit is arranged in the unit of block (two dummy blocks are arranged for one block). In either case, it is preferable that the same bit is not arranged on one radially extending line or the same circumference.

Further, when two components are treated as the same bit, it is preferable that the averaging is effected and the threshold process is effected at the reading time to check the presence or absence of the bit. If two or more dummy bits are used (three or more the same bits are used), a procedure of majority decision may be taken.

By treating the bit in the above-described manner, the erroneous determination at the time of reading can be prevented. For example, if an original is a dot image or line drawing, high-frequency components may sometimes occur in the color difference direction and error determination is made. In order to alleviate this, a plurality of components are treated as one unit.

In this embodiment, it is also possible to directly embed specified information into the second color signals Y', M', C' without using the first conversion circuit 902 and the second conversion circuit 908 as follows.

In case of directly embedding the specified information into the color signals without using the first and second conversion circuit, the embedding processing section is composed as shown in FIG. 23. Like the fourth embodiment, specified information is generated by a code generator 2303 and a pattern signal is generated by a pattern generating circuit 2304. In this case, an amplitude of the pattern signal which is to be given in the direction of color difference is β. In a signal converting circuit 2305, the pattern signal is converted into a variation signals which is adequate to add on a first color signals Y, M, C supplied from a input system 2301. The variation signals DY, DM, DC to be added to the first color signals are expressed by the following equations. In this case, the procedure of calculating an amount D of the periodic component to be arranged is the same as described before.

$$DY = +(\Sigma\Sigma\beta)\cdot\tfrac{2}{3} \qquad (51)$$

$$DM = -(\Sigma\Sigma\beta)/3 \qquad (52)$$

$$DC = -(\Sigma\Sigma\beta)/3 \qquad (53)$$

The variation signals obtained by the above equations are supplied to a adder 2306 and second color signals Y', M', C' are obtained.

It is possible to including the function of the present invention in a general printer, a facsimile machine, or the like by way of incorporating a medium such as add-on ROM board. In this case, the medium includes a code generating/adding section 230a constructed by the code generator 2303, the pattern generating circuit 2304, the signal converting circuit 2305, and the adder 2306.

Next, the process of reading specified information printed in the above-described procedure is explained.

For the reading of specified information, a scanner having an RGB (Blue, Green, Yellow) color separation filter is used.

Figure 12:
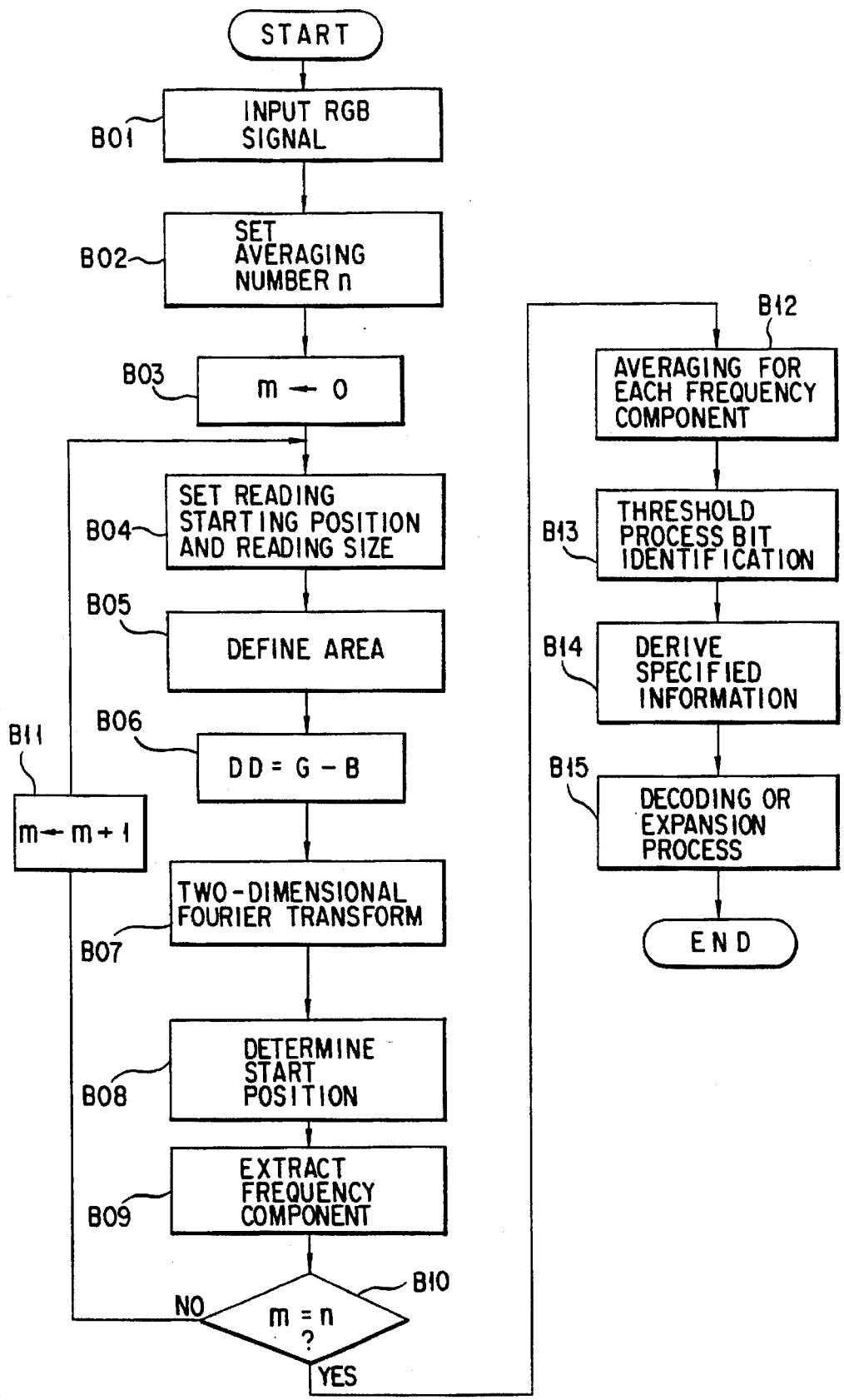
FIG. 12 is a flowchart showing the process of the readout processing section in the image processing apparatus according to the sixth and seventh embodiments of the present invention.

Now, the process of extracting specified information is explained with reference to the flowchart of FIG. 12. The size to be extracted is sufficient if it is 64×64 pixels. For example, the above size can be expressed by 4×4 mm in terms of 400 dpi and it is only necessary to use a portion of the image. In other words, in the present embodiment, the specified information pattern may be superposed on only a portion of the region, if the region has been known. First, an RGB signal is input (step B01). The division number n for the averaging is set (step B02). The number m is set to 1 (step B03). The reading starting position and reading size are set (step B04). An area to be read is defined (step B05). In order to extract only the color difference (G—B) among the input RGB signal, DD=G−B is set (step B06). In this case, G is a complementary color of M and B is a complementary color of Y. The two-dimensional Fourier transform is effected (step B07), and the start bit position is determined based on the component of a frequency (2 cycle/mm) of the limit of visual sense (step B08). The presence or absence of the above component in each bit is determined based on the start position, each bit is set to "0" when the component is not detected, and is set to "1" when the component is detected, and thus the input data is determined (step B09). Next, whether m is equal to the division number n or not is checked (step B10). If it is "NO", "1" is added to m (step B11) and the steps B14 to B09 are repeated. If it is "YES", the next step is effected. In order to enhance the reliability of data, a plurality of areas are sampled and the sampled values are averaged for each frequency component on the Fourier transform plane (step B12). Further, if necessary at this time, an area to be sampled is enlarged. Further, the threshold process is effected to determine whether the bit is present or absent (step B13). Then, the specified information is calculated (step B14). When the readout data is encoded, the decoding process is effected, and when it is compressed, the expansion process is effected (step B15).

In the above process, in case that dummy bits are not provided in the Fourier transform plane, i.e., in case that every bit is given differing information in the Fourier transform plane, steps B2, B3, B10, B11, and B12 are omitted.

As described above, according to the sixth embodiment, it is possible to prevent occurrence of unnatural sense of vision even if a large amount of specified information is embedded. Even if the image is inclined to some extent at the reading time, frequency components are precisely detected without making erroneous determination.

In the sixth embodiment, the case wherein the specified information is embedded in the color difference direction is explained. However, it is possible to modify to the case of embedding in the chroma direction or the case of varying the amplitude of the embedding pattern in accordance with high-frequency component of visual sensitivity or luminance.

Next, a seventh embodiment is explained.

In the sixth embodiment, a case wherein frequency components are arranged in a circular form or elliptical form on the Fourier transform plane is explained. On the other hand, in the seventh embodiment, a case wherein the components are arranged in a lattice form is explained.

The general procedure of embedding specified information is the same as that explained in the sixth embodiment. Further, the embedding processing section in this embodiment has the same construction as that of FIG. 9 used in the sixth embodiment. However, the process in the information processing section 905 is different. Like the case of the sixth embodiment, it is also possible to directly embed specified information into color signals without using the first and second conversion circuits.

Figure 13:
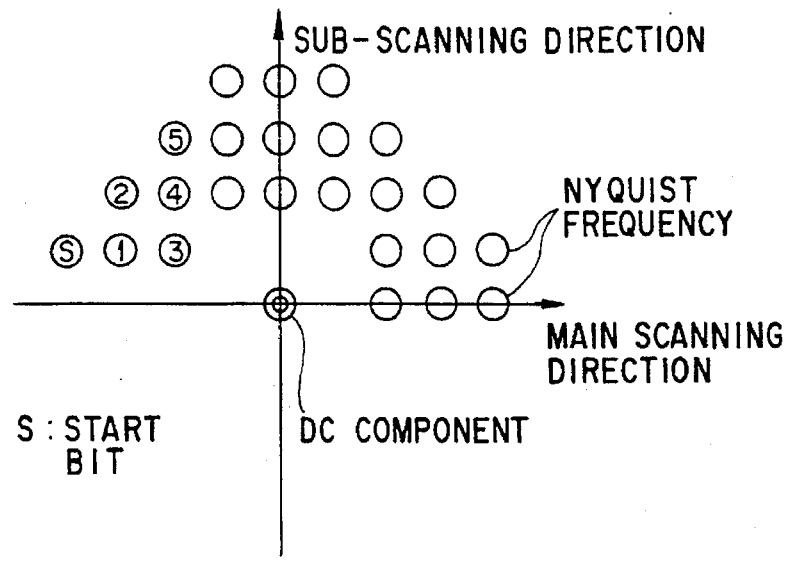
FIG. 13 is a diagram showing the bit arrangement on a Fourier transform plane used in the seventh embodiment shown in FIG. 9.

First, as shown in FIG. 13, periodic components are arranged in a lattice form on the Fourier transform plane. When the period in the main scanning direction is WL1 and the period in the sub-scanning direction is WL2, the equation expressing the amount of the periodic components to be arranged is as follows. ΣΣ implies the sum expressed in terms of WL1, WL2.

$$\Sigma\Sigma\beta(WL1,\ WL2) = (WI/2)\cdot\cos(x\cdot 2\pi/WL1 + y\cdot 2\pi/WL2 + \beta(WL1,\ WL2)) \qquad (54)$$

In this case, β indicates a phase shift which varies in the range of $0 \le \beta < 2\pi$ and the value thereof is changed for each frequency component to reduce the influence by superposition of the pixels. However, when one of WL1 and WL2 corresponds to the Nyquist frequency, the value of β is set so as not to lie near π/2 or 3π/2, thus preventing loss of the frequency component.

The periodic components are added on the position where both of WL1 and WL2 correspond to the range close to the Nyquist frequency and the degradation tends to occur, as shown in FIG. 13.

The process of extracting specified information is the same as that explained in the sixth embodiment.

As described above, according to the seventh embodiment, when an amount of specified information is relatively small, it can be easily treated. Further, superposition between the periodic components tends to occur and periodic components of low frequencies which are eyesores tend to occur. In order to prevent this, a phase difference in the range of 0 to 2π is given to each periodic component to suppress occurrence of superposition. As a result, degradation in the image can be prevented.

Next, the eighth embodiment is explained.

FIG. 14 is a block diagram showing an embedding processing section in an image processing apparatus according to the eighth embodiment of this invention.

As shown in FIG. 14, an input system 1401 is provided in the embedding processing section i.e. the color printer. Graphic data or text data as first color signals Y, M, C is supplied to bit map developing section 1402. The bit map developing section 1402 develops bit map in accordance with the first color signals Y, M, C supplied from the input system 1401, so as to supply to an adder 1407.

Further, a code generator 1403 is provided in the embedding processing section. The code generator 1403 holds specified holds specified information to be embedded in the graphic data or the like, generates the specified information in a coded form, and supplies the same to information processing section 1404. The information processing section 1404 effects processing for the code supplied from the code generator 1403 for encipherment or compression and supplies the result of processing to a pattern generating circuit 1406.

Further, a mode selector 1405 is provided in the embedding processing section. A signal indicating any one of the mode is supplied from the mode selector 1406 to the pattern generating circuit 1406. The pattern generating circuit 806 generates a pattern signal based on the code supplied from the code generator 805 and supplies the same to the adder 1407.

The adder 1407 adds (or subtracts) the pattern signal from the pattern generating circuit 1406 to (or from) the first color signals Y, M, C from the bit map developing section 1402. The second color signals Y', M', C' to which the pattern signal is added are supplied to an error diffusion processing circuit 1408. The output from the error diffusion processing circuit 1408 is supplied to an output system 1409. The output system 1409 prints out a graphic or a text in accordance with the second color signals Y', M', C'.

Next, the operation of the eighth embodiment is explained.

In this embodiment, when data is obtained by developing graphic data or text data into bit map or the like, a pattern having frequency components is superposed on the above data. The embedding pattern is based on the code data representing contents of e.g. a secret document. The pattern is generated by using a Fourier transform plane explained in the former embodiments.

When data into which the pattern will be embedded is binary data such as a character, a binary graphic, or the like, unprinted portion of the original sheet to be printed may become entire white and printed portion may become solid setting. In this case, even if pattern adding on either the unprinted portion or the printed potion are performed, an amplitude are reduced into its half, and thus, it becomes difficult to extract pattern embedded. In order to solve the problem, the pattern is so embedded that a small amount of ink will be given to the field (i.e., unprinted portion of the original sheet). That is, at the time of embedding the pattern, color signals Y0, M0, C0 representing ink amount are given. In this case, the value of color signal (an amount of ink) is preferably approx. ⅙ of amplitude WI of the frequency component in the range of the Nyquist frequency explained in the sixth embodiment. It is also possible to further reduce to its half for the value of color signal (an amount of ink) except Y0. In this case, it is probable that the field will become yellowly. When color balance is more important than luminance balance, color signals are set Y0=M0=C0. The conversion of the color signals is expressed by the following equations.

$$Y'=Y0+(\Sigma\Sigma\beta)\tfrac{2}{3} \qquad (55)$$

$$M'=M0-(\Sigma\Sigma\beta)/3 \qquad (56)$$

$$C'=C0-(\Sigma\Sigma\beta)/3 \qquad (57)$$

In the case where a representable gradation number of the used printer is small, an error diffusion processing is effected by the error diffusion processing circuit 1408 for the data into which a pattern has been embedded.

Further, in this embodiment, the mode selector 1405 for selecting one of high-precision mode and normal mode is provided on a control panel (not shown). It is possible to set so that the pattern generating/embedding process will be effected only when high-precision mode is selected.

Specifically, in case of embedding a pattern to a graphic image, many lines appear. In this case, if the band elimination process is effected at the inputting time, the degradation of the information occurs.

Therefore, on the Fourier transform plane, as shown in FIG. 15, the frequency components causing to generate a line image (frequent components on the main scanning direction axes or the sub-scanning direction axes) are not arranged.

The process of extracting specified information is the same as that explained in the sixth embodiment.

As described above, according to the eighth embodiment, in case of treat binary data such as a character, a binary graphic, or the like, the specified information is easily embedded/extracted.

Next, a ninth embodiment is explained.

FIG. 16 is a block diagram showing an embedding processing section in an image processing apparatus according to the ninth embodiment of this invention.

As shown in FIG. 16, the embedding processing section is constructed by two color facsimile i.e. transmitting unit 161 and receiving unit 162. An input system 1601 is provided in the embedding processing section. Data as first color signals Y, M, C is supplied from the input system 1601 to a compression/coding section 1602. The compression/coding section 1602 effects compression or coding operation based on the data so as to supply to an adder 1605. Further, a code generator 1603 holds specified information A, generates the specified information A in a code form, and supplies the same to an information processing section 1604. The information processing section 1604 processes the code supplied from the code generator 1603 for encipherment or compression and supplies the result of processing to the adder 1605. The adder 1605 adds (or subtracts) the code (specified information A) from the information processing section 1604 to (or from) the data from the compression/ coding section 1602. The data to which the code (specified information A) is added is transferred to a information separating section 1606 in the receiving unit 162. The information separating section 1606 separates the specified information A from the transferred data, supplies main data to a expanding section 1607 and supplies the specified information A to information synthetic section 1610. The expanding section 1607 expands the main data to supply to an adder 1612. On the other hand, a code generator 1608 generates a code representing unit number of the receiving unit 162 or a code (specified information B) representing working section and supplies the same to a information processing section 1609. The information processing section 1609 processes the code (specified information B) supplied from the code generator 1608 for encipherment or compression and supplies the result of processing to the information synthetic section 1610. The information synthetic section 1610 synthesizes the specified information A from the information separating section 1606 and the specified information B from the information processing section 1606 to supply the synthesized result to a pattern generating circuit 1611. The pattern generating circuit 1611 generates a pattern based on the synthesized code and supplies the same to the adder 1612. The adder 1612 adds the pattern from the pattern generating circuit 1611 to the data from the expanding section 1607 and supplies the addition result to an error diffusion processing circuit 1613. The error diffusion processing circuit 1613 supplies the data from the adder 1612 to an output system 1614. The output system 1614 outputs the above data.

Next, the operation of the ninth embodiments explained.

When data transfer between e.g. two facsimiles is executed, it is considered both of the case that the specified information is required to be embedded on the transmitting side and the case that the same is required to be embedded on the receiving side. First, it is considered, as a simple means, that after embedding a pattern into data, the embedded data is transferred from the transmitting side, and the embedded data is received in the receiving side. However, it is considered that, since the color information data itself is so large, the data is transferred after compressing process is effected. Further, the data is transferred after coding process is effected. FIG. 16 shows a sample configuration in relation to the above description.

The data is processed of compression or coding by the compression/coding section 1602. Next, the coded specified information is combined with the main data which is to be transferred as a header or a trailer, as shown in FIGS. 17A and 17B. In this case, a starting 5 bit or an end bit as a mark is provided on the boundary.

The specified information is considered as a unit number indicating the transmitting unit, a data attribute (e.g., classification of the secret matter), or a coded number indicating the transmitting section. On the other hand, in the receiving unit 162, the data including the received specified information is once separated the specified information from the main data. In this case, if necessary, the specified information (code) which representing the unit number or the section number is synthesized with the specified information (code) transferred from the transmitting unit 161. The synthesized specified information is generated as a pattern from the pattern generating circuit 1611. The pattern is embedded into the data which has been executed a process such as the bit map developing explained in the sixth embodiment. Thereafter, the data is output through the process such as error diffusion process. In the above procedure, it is possible to embedding specified information only in the transmitting unit 161 but in the receiving unit 162.

The process of extracting specified information is the same as that explained in the sixth embodiment.

As described above, according to the ninth embodiment, it is possible to embedding both of the specified information in the transmitting side and in the receiving side, between color facsimiles. Further, it is also possible to embedding only the specified information in the transmitting side into the transferring data.

Next, a tenth embodiment is explained.

In the eighth embodiment, the case of application to a color printer is explained, whereas in the tenth embodiment, the case of application to monochromatic printer is explained. In this embodiment, FIG. 14 which is used in the eighth embodiment is also used for reference.

FIG. 14 is a block diagram showing an embedding processing section in an image processing apparatus according to the tenth embodiment of this invention.

The fourth embodiment is the same as the eighth embodiment except for color primaries of color signals. That is, in FIG. 14, first color signals K (not Y, M, C) is supplied from the input unit 1401 to the bit map memory 1402, and second color signals K' (not Y', M', C') are supplied from the adder 1407 to the error diffusion processing circuit 1408.

Next, the operation of the tenth embodiment is explained.

It is difficult to vary in color difference direction or chroma direction. However, the monochromatic printer has the capability of representing higher resolution e.g. 600 dpi than that of the color printer. When a pattern is generated by the pattern generating circuit 1406, a Fourier transform plane is used. Since visual sensitivity is high for variation in the luminance direction in the Fourier transform plane, the frequency in limit of eyesight is relatively high as shown in FIG. 18. That is, higher frequency components than the frequency in limit of eyesight, i.e., 8 [cycle/mm] should be added. Therefore, the range in which frequency components can be arranged is limited, as shown in FIG. 18. Like the case of the color printer, the pattern embedding into data is executed after bit map developing process.

In case that it is not preferable that original background portion becomes grayish, an embedding technique such as varying row pitch or character string pitch in a very small quantity is used. If a high-resolution printer is used, a gap of approx. 1 dot does not identified as far as characters does not slide to longitudinal or lateral direction. By use of the above characteristic, the row pitch or the character string pitch is varied for each line or character to embed the specified information. For example, as shown in FIG. 19, row pitch L0, L1 or character string pitch m0, m1 are varied. Further, in case of regular A4 sized document, 40×36 characters in size of approx. 10 points are arranged on all area of the document. In this case, if using all row pitches and character string pitches, 39+35=74 bits data can be embedded. Further, large amount of specified information can be embedded as the resolution of the printer becomes higher.

The technique for embedding specified information by varying row pitch or character string pitch for each line or character is applicable to a printer wherein text data is not developed to bit map (i.e. a thermal printer). That is, even if varying feed pitch of the head (character string pitch) or feed pitch of the recording paper (row pitch), the same effect is obtained.

As described above, this invention has the following effects throughout the first to tenth embodiments.

By use of this invention, specified information can be recorded without giving unnatural sense of vision when a normal printer is used to output. The recorded pattern can be sufficiently read even if a scanner used at the reading time does not have a high resolution exceeding the limit of visual sense. For example, a scanner having the same resolution as that used in a normal copying machine can be used.

Further, since the color difference and chroma are not substantially present in the frequency band exceeding the limit of eyesight in general image information, it becomes possible to separate and extract the recorded specified information with extremely high precision by converting the image information into a color difference signal and chroma signal and subjecting the same to the band elimination process. As a result, the image information can be prevented from being erroneously read as specified information at the reading time.

Further, according to this invention, a bar code which cannot be identified by the human eyes can be recorded. Therefore, a bar code can be attached to an article to which a bar code cannot be normally attached since it is an extremely small article, for example, or which looks bad in design when a bar code is attached thereto.

Further, according to this invention, specified information can be recorded on color image information without causing a degradation in the image quality of a color image and the specified information recorded on the color image information can be separated and read with high precision.

Further, according to this invention, specified information can be easily embedded even either on an original sheet for color characters or on a graphic image. Further, even if an original sheet for monochromatic image or monochromatic characters is used, it is possible to embed into the specified information without being visually identified. Therefore, the present invention is applicable to not only a color printer but also a color facsimile or a monochromatic printer.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, the band elimination circuit for eliminating an old information of image when specified information is superposed on the image is provided in the sixth embodiment. However, the band elimination circuit is commonly applicable to another embodiments (e.g., the first to three embodiments). Although the specified information is explained with reference to a sample of the detailed output system, the above embodiments shows it as only one sample and therefore any kind of information can be embedded. In addition, not only two-dimensional Fourier transform plane but also one-dimensional Fourier transform plane can be applicable to the sixth to tenth embodiments wherein Fourier transform planes are used for embedding multiplexed frequency information.

What is claimed is:

1. An apparatus for processing a color image, comprising:

means for generating a pattern image based on a data signal to be embedded in the color image; and image processing means for varying at least one of a color difference signal and a chroma signal of the color image in accordance with the pattern image while keeping a sum of three color component signals of the color image constant so that the color image includes the data signal.

2. The apparatus according to claim 1, wherein said three color component signals are primaries of substructive mixture.

3. The apparatus according to claim 1, wherein said three color component signals are primaries of additive mixture.

4. The apparatus for processing a color image, comprising:

means for generating a pattern image based on information to be embedded in the color image; and image processing means for varying at least one of a color difference signal and a chroma signal of the color image in accordance with the pattern image so that the color image includes the information, wherein said image processing means includes:

means for converting three color component signals into a luminance signal, and a first and second color difference signals, and means for embedding the information into the second color difference signal.

5. The apparatus according to claim 4, wherein said first color difference signal is a red-green color difference signal and said second color difference signal is a yellow-blue color difference signal.

6. The apparatus for processing a color image, comprising:

means for generating a pattern image based on information to be embedded in the color image; and image processing means for varying at least one of a color difference signal and a chroma signal of the color image in accordance with the pattern image so that the color image includes the information, wherein said image processing means includes:

means for converting three color component signals into a luminance signal, and a first and second color difference signals, and means for embedding the information into the first and second color difference signals.

7. The apparatus according to claim 6, wherein said first color difference signal is a red-green color difference signal and said second color difference signal is a yellow-blue color difference signal.

* * * * *